United States Patent
Noh et al.

(10) Patent No.: US 12,294,652 B2
(45) Date of Patent: May 6, 2025

(54) STORAGE CONTROLLER AND METHOD OF OPERATING ELECTRONIC SYSTEM

(71) Applicant: Samsung Electronics Co., Ltd., Suwon-si (KR)

(72) Inventors: Kyungwoo Noh, Yongin-si (KR); Jisoo Kim, Seongnam-si (KR); Kyungjin Lee, Seoul (KR); Younghyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 17/898,045

(22) Filed: Aug. 29, 2022

(65) Prior Publication Data
US 2023/0179418 A1    Jun. 8, 2023

(30) Foreign Application Priority Data

Dec. 2, 2021    (KR) .................. 10-2021-0170629

(51) Int. Cl.
*H04L 9/32* (2006.01)
*H04L 9/06* (2006.01)
*H04L 9/08* (2006.01)

(52) U.S. Cl.
CPC .......... *H04L 9/3213* (2013.01); *H04L 9/0643* (2013.01); *H04L 9/0861* (2013.01); *H04L 9/3247* (2013.01)

(58) Field of Classification Search
CPC ... H04L 9/3213; H04L 9/0643; H04L 9/0861; H04L 9/3247; H04L 9/0891; H04L 9/3242; H04L 9/0894; H04L 9/3226; H04L 9/3228; H04L 9/3268; H04L 9/3271; H04L 9/0825; H04L 9/3231; H04L 9/3263; G06F 21/79; G06F 21/602; G06F 21/62; G06F 12/1466; G06F 3/062; G06F 12/1408; G06F 21/33; G06F 21/78
See application file for complete search history.

(56) References Cited

U.S. PATENT DOCUMENTS

| 6,651,168 | B1 * | 11/2003 | Kao | ..................... G06F 21/41 |
| | | | | 713/185 |
| 7,831,837 | B1 * | 11/2010 | Duane | .................... G06F 21/34 |
| | | | | 713/185 |

(Continued)

FOREIGN PATENT DOCUMENTS

KR    1020140074745 A    6/2014

*Primary Examiner* — J. Brant Murphy
(74) *Attorney, Agent, or Firm* — Muir Patent Law, PLLC

(57) ABSTRACT

A storage device includes a memory device storing data, and a controller controlling the memory device. The controller obtains and stores a certificate including a public key of an administrator from a host device, provides a nonce to the host device in response to a request from the host device, receives a token request signature including the nonce, a user identifier (ID), an allowed command list and a lifetime from the host device, and when it is verified that the token request signature is generated by a legitimate administrator by decrypting the token request signature with the public key, generates a token for allowing a user corresponding to the user ID to execute a command included in the allowed command list during the lifetime, and a token secret key corresponding to the token, and provides the token and the token secret key to the host device.

20 Claims, 21 Drawing Sheets

(56) References Cited

U.S. PATENT DOCUMENTS

| | | | | |
|---|---|---|---|---|
| 8,875,263 | B1* | 10/2014 | van Dijk | H04L 63/0846 |
| | | | | 709/225 |
| 10,735,192 | B2* | 8/2020 | Kim | H04L 9/3213 |
| 10,951,618 | B2* | 3/2021 | Baer | H04L 63/104 |
| 11,025,732 | B2* | 6/2021 | Mitsov | G06F 9/4843 |
| 2013/0198813 | A1* | 8/2013 | van Roermund | G06F 21/30 |
| | | | | 726/4 |
| 2016/0012465 | A1* | 1/2016 | Sharp | G06Q 20/321 |
| | | | | 705/14.17 |
| 2016/0253651 | A1* | 9/2016 | Park | G06Q 20/34 |
| | | | | 705/39 |
| 2018/0114013 | A1* | 4/2018 | Sood | G06F 21/606 |
| 2018/0351741 | A1* | 12/2018 | Kim | H04L 9/0819 |
| 2019/0080074 | A1* | 3/2019 | Kawai | H04L 63/0815 |
| 2020/0145403 | A1* | 5/2020 | Chang | G06F 21/6218 |
| 2020/0153831 | A1* | 5/2020 | Baer | H04L 63/10 |
| 2020/0396299 | A1* | 12/2020 | Mitsov | G06F 9/4843 |
| 2021/0049309 | A1* | 2/2021 | Su | G06F 3/062 |
| 2021/0144133 | A1* | 5/2021 | Allo | H04L 63/0853 |
| 2021/0227386 | A1* | 7/2021 | Lee | H04W 12/065 |
| 2022/0417089 | A1* | 12/2022 | Johansson | H04L 63/168 |
| 2023/0179418 | A1* | 6/2023 | Noh | H04L 9/0861 |
| | | | | 713/168 |

* cited by examiner

Token list

| Token | Token secret key | Lifetime |
|---|---|---|
| A | a | 1 |
| B | b | 5 |
| C | c | 3 |
| ... | ... | ... |

FIG. 8A

User list

| Token | User ID |
|---|---|
| A | User 1 |
| B | User 2 |
| C | User 3 |
| ... | ... |

FIG. 8B

Permissible CMD list

| Token | Permissible CMD |
|---|---|
| A | CMD1, CMD2, CMD5 |
| B | CMD2, CMD3 |
| C | CMD4 |
| ... | ... |

FIG. 8C

STORAGE CONTROLLER AND METHOD OF OPERATING ELECTRONIC SYSTEM

CROSS-REFERENCE TO RELATED APPLICATION(S)

This application claims the benefit of priority under 35 USC 119(a) of Korean Patent Application No. 10-2021-0170629 filed on Dec. 2, 2021 in the Korean Intellectual Property Office, the entire disclosure of which is incorporated herein by reference for all purposes.

BACKGROUND

The present inventive concept relates to a storage device and a method of operating an electronic system including the storage system.

Storage devices using a semiconductor memory device have advantages in terms of excellent stability and durability because there are no mechanical driving parts, and may also have significantly fast information access speeds and low power consumption. Storage devices having such advantages include a Universal Serial Bus (USB) memory device, a memory card having various interfaces, a solid state drive (SSD), and the like.

A storage device may support various vendor specific commands as well as commands for reading and writing user data. The use of vendor-specific commands may expose important information inside the storage device, which may cause security problems in the storage device and a host device.

SUMMARY

Example embodiments provide configurations and operations related to a storage device supporting various command operations.

Example embodiments provide a storage device capable of allowing execution of a specific command only to an authorized user to thereby improve security of the storage device.

According to example embodiments, a storage device includes a memory device storing data; and a controller controlling the memory device. The controller obtains and stores a certificate including a public key of an administrator from a host device, provides a nonce to the host device in response to a request from the host device, receives a token request signature including the nonce, a user identifier (ID), an allowed command list and a lifetime from the host device, and when it is verified that the token request signature is generated by a legitimate administrator by decrypting the token request signature with the public key, generates a token for allowing a user corresponding to the user ID to execute a command included in the allowed command list during the lifetime, and a token secret key corresponding to the token, and provides the token and the token secret key to a host device.

According to example embodiments, a storage device includes a memory device storing data; and a controller controlling the memory device. The controller receives a command message including a token and a command and an external authentication code from a user of the host device, generates an internal authentication code by encrypting the command message using a token secret key corresponding to the token, determines whether the token is a valid token by comparing the external authentication code with the internal authentication code, and executes the command according to a result of determining whether the token is a token granted to the user when the token is a valid token and whether the token is a token for allowing the execution of the command.

According to example embodiments, a method of operating an electronic system including a host device and a storage device includes generating, by the host device, a token request signature for allowing a specific user to execute a specific command, using a private key of an administrator, and providing the token request signature to the storage device; verifying, with the storage device, the token request signature using a public key paired with the private key; generating, with the storage device, a token and a token secret key, storing the token and a token secret key in the storage device, and providing the token and the token secret key to the host device; providing, by the host device, a command message including a command requested by a user and a token, and an external authentication code obtained by encrypting the command message using the token secret key provided to the host device to the storage device; generating, with the storage device, an internal authentication code obtained by encrypting the command message using the token secret key stored therein, and comparing the internal authentication code with an external authentication code to confirm whether the token is a valid token; and when the token is a valid token, executing the command according to a result of the storage device determining whether the token is a token granted to the user and a token for allowing execution of the command.

BRIEF DESCRIPTION OF DRAWINGS

The above and other aspects, features, and advantages of aspects of the present inventive concept will be more clearly understood from the following detailed description, taken in conjunction with the accompanying drawings, in which:

FIGS. 6, 7, 8A, 8B, and 8C are diagrams illustrating, in greater detail, the operation of the host-storage system for acquiring the token in operation S20;

DETAILED DESCRIPTION

Hereinafter, various embodiments will be described in detail with reference to the accompanying drawings.

Figure 1:
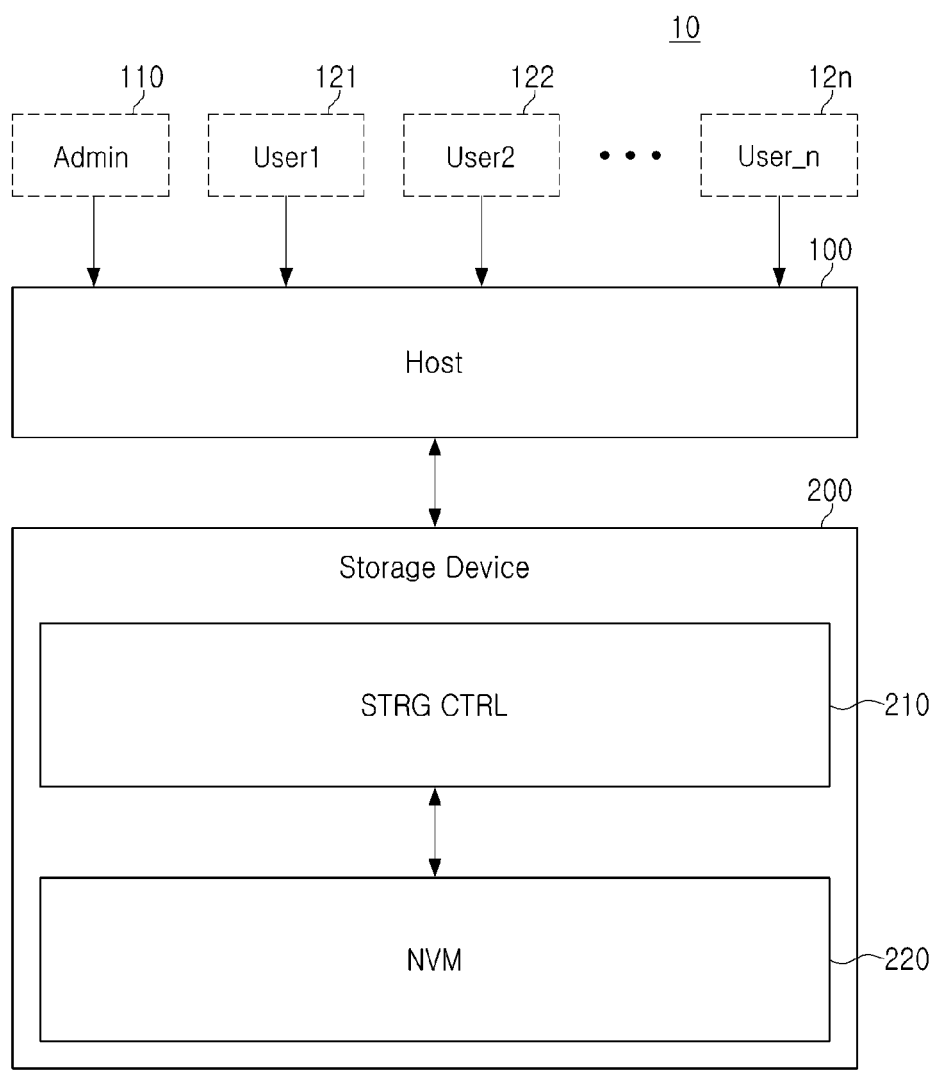
FIG. 1 is a block diagram illustrating a host-storage system according to an example embodiment.

FIG. 1 is a block diagram illustrating a host-storage system according to an example embodiment.

The host-storage system 10 may include a host 100 and a storage device 200. Also, the storage device 200 may include a storage controller 210 and a nonvolatile memory (NVM) 220.

The host (e.g., "host device") 100 may include an electronic device, for example, portable electronic devices such as a mobile phone, an MP3 player, a laptop computer, or electronic devices such as a desktop computer, a game machine, a TV, a projector or the like, and a server computer, or the like. The host 100 may include at least one operating system (OS). The operating system may overall manage and control the functions and operations of the host 100.

The host 100 may be used by various users 121, 122, . . . 12n and may be managed by an administrator 110.

The storage device 200 may include storage media for storing data according to a request from the host 100. As an example, the storage device 200 may include at least one of a solid state drive (SSD), an embedded memory, and a removable external memory. When the storage device 200 is an SSD, the storage device 200 may be a device conforming to a nonvolatile memory express (NVMe) standard. When the storage device 200 is an embedded memory or an external memory, the storage device 200 may be a device conforming to a universal flash storage (UFS) or an embedded multi-media card (eMMC) standard. The host 100 and the storage device 200 may generate and transmit a packet according to an adopted standard protocol, respectively.

The nonvolatile memory 220 may maintain stored data even when power is not supplied. The nonvolatile memory 220 may store data provided from the host 100 through a program operation, and may output data stored in the nonvolatile memory 220 through a read operation.

When the nonvolatile memory 220 includes a flash memory, the flash memory may include a 2D NAND memory array or a 3D (or vertical) NAND (VNAND) memory array. As another example, the storage device 200 may include other various types of nonvolatile memories. For example, Magnetic RAM (MRAM), Spin-Transfer Torgue MRAM, Conductive bridging RAM (CBRAM), Ferroelectric RAM (FeRAM), Phase RAM (PRAM), Resistive RAM, and various other types of memory may be applied to the storage device 200.

The storage controller 210 may control the nonvolatile memory 220 in response to a request from the host 100. For example, the storage controller 210 may provide data read from the nonvolatile memory 220 to the host 100, and store the data provided from the host 100 in the nonvolatile memory 220. For this operation, the storage controller 210 may support operations such as read, program, and erase of the nonvolatile memory 220.

The storage controller 210 may support a read command and a write command as well as various vendor specific commands. Some commands among various commands supported by the storage controller 210 should be allowed to be executed only by a limited number of users (e.g., users deemed as "authorized users") in order to maintain the security of the storage device 200.

If the storage controller 210 associates a password to a command and permits execution of the command only when the host 100 provides the command together with the password, it may be difficult to provide sufficient security to the storage device 200. For example, if the password is leaked, the command may be executed by an unauthorized user, and once a user has the password, it is difficult to revoke the user's access authority.

According to an example embodiment, the storage device 200 may allow execution of a specific command only to a user having legitimate authority through token-based authentication. For example, the storage device 200 may issue a token that allows a specific user to execute a specific command in response to a request from the admin manager of the host 100, thereby preventing other users from executing the command even when the token is leaked. In addition, the storage device 200 may terminate the token according to the number of times the token is used, or may revoke a specific user's access authority to a specific command according to the token in response to a request from the administrator. Accordingly, the storage device 200 may provide improved security.

Hereinafter, an example embodiment will be described in more detail with reference to FIGS. 2-7, 8A-8C, and 9-18.

Figure 2:
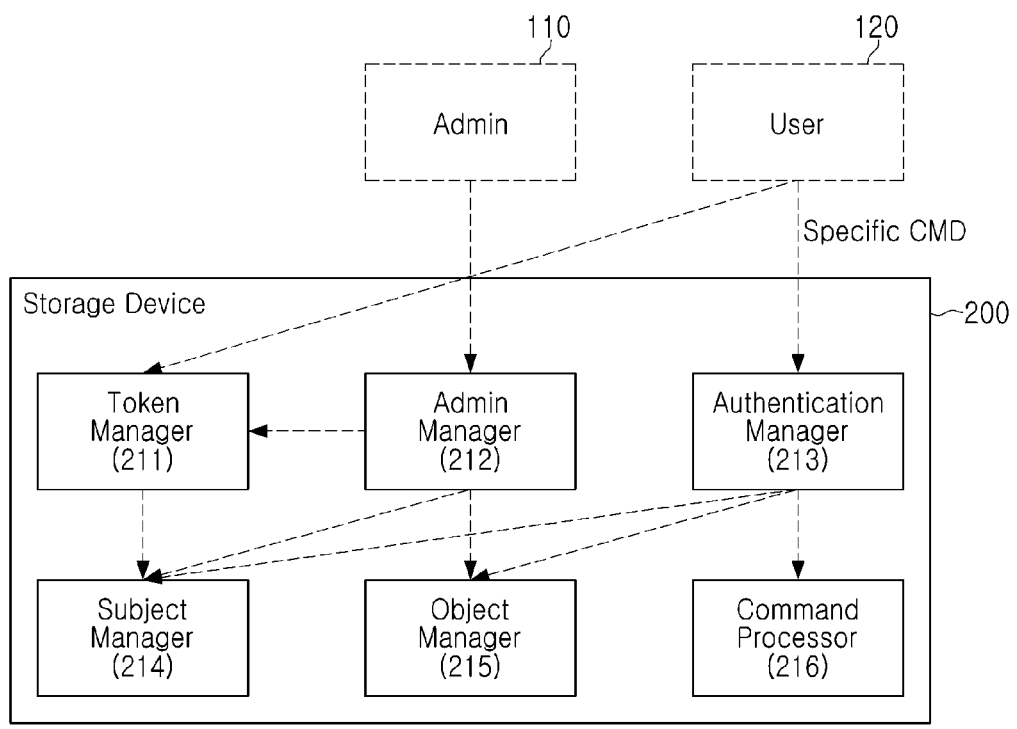
FIG. 2 is a block diagram illustrating a configuration of a storage device 200 according to an example embodiment.

FIG. 2 is a block diagram illustrating a configuration of a storage device 200 according to an example embodiment.

FIG. 2 illustrates a storage device 200, the administrator 110, and a user 120. The storage device 200 and the administrator 110 may correspond to those described with reference to FIG. 1. The user 120 may correspond to any of the users 121, 122, . . . 12n described with reference to FIG. 1.

The storage device 200 may include a token manager 211, an admin manager 212, an authentication manager 213, a subject manager 214, an object manager 215, and a command processor 216. The token manager 211, the admin manager 212, the authentication manager 213, the subject manager 214, the object manager 215 and the command processor 216 may be included in the storage controller 210 described with reference to FIG. 1. For example, the storage controller 210 may include a processor and memory, and the token manager 211, the admin manager 212, the authentication manager 213, the subject manager 214, the object manager 215, and the command processor 216 may be implemented in firmware, and may be loaded into the memory of the storage controller 210 and driven by the processor. For example, as discussed in further detail with respect to FIG. 19 below, the memory of the storage controller 210 may be an operation memory and the operation memory may be driven by a processor, such as CPU 613.

The token manager 211 may generate a token and a token secret key in response to the request of the administrator 110. A token may be a sequence of strings to allow a specific user to perform a specific command. When a legitimate (i.e., authorized) user who has been issued a token presents the token along with a specific command, the storage device 200 may allow execution of the specific command. The token secret key is a two-way encryption key, and may be used by a user to encrypt a message including a token and a command, and may be used with the storage device 200 to decrypt an encrypted message received from the user. One token and token secret key may be paired, and each token and token secret key may consist of a string containing random alphanumeric characters.

The token manager 211 may also manage the lifetime (e.g., lifespan) of the token and update the expired token. When the token manager 211 receives a request for an updated token from the user 120 having an expired token, the token manager 211 may provide the updated token to the user 120 according to a result of authenticating the expired token.

The admin manager 212 may control the token manager 211 to perform an operation such as generating a token by a legitimate (i.e., authorized) administrator. The admin manager 212 may receive a certificate from the administrator 110 and store the certificate in the storage device 200. The certificate may include a public key paired with a private key of the administrator 110. When the administrator 110 provides a token request message to the storage device 200, the administrator 110 may provide the message by signing the message with the private key. The admin manager 212 verifies the signature using the public key, and may process a token request and the like only when the message is a message received by a legitimate administrator.

When receiving a token and a message from the user 120, the authentication manager 213 may authenticate whether the token is a valid token. The token and message may be received along with an authentication code. The authentication code may be a code generated by encrypting the token and message with a token secret key. The authentication manager 213 may obtain a token secret key corresponding to the token received from the user 120 from the token manager 211, and an internal authentication code may be generated by encrypting the token and message received from the user 120 using the token secret key. The authentication manager 213 may authenticate the token by determining whether the received authentication code and the generated internal authentication code are the same.

The subject manager 214 may manage the token to be used only by a predetermined user. When the administrator 110 provides the token request message, the user information of the token may be specified in the message. The subject manager 214 may store the token generated by the token manager 211 and information indicating a user who may use the token. Although the token received with the command from the user 120 is a valid token, the subject manager 214 may reject the command execution when it is not a token issued for the user.

The object manager 215 may manage a token to execute only a predetermined command. When the administrator 110 provides the token request message, the message may include a list of permitted commands to allow execution by using the token. The object manager 215 may store information indicating a relationship between a token generated by the token manager 211 and commands included in the allowed command list. Even when the token received with the command from the user 120 is a valid token, the object manager 215 may reject the command execution when it is not a token issued to execute the command.

The command processor 216 may execute commands requiring authentication according to the authentication result of the authentication manager 213. For example, when it is confirmed that a command requiring authentication from the authentication manager 213 is received from a legitimate user along with a valid token, the command processor 216 may execute the command.

The command requiring authentication may be all or some commands among commands supported with the storage device 200. For example, the storage device 200 may execute general commands such as a read command and a write command without performing authentication. On the other hand, the storage device 200 may execute vendor-specific commands supported for a specific user after authentication is completed.

According to an example embodiment, the storage device 200 may provide improved security by performing a token-based authentication procedure to execute a command that is deemed to need to be restricted to a specific user(s), such as a vendor-specific command.

Figure 3:
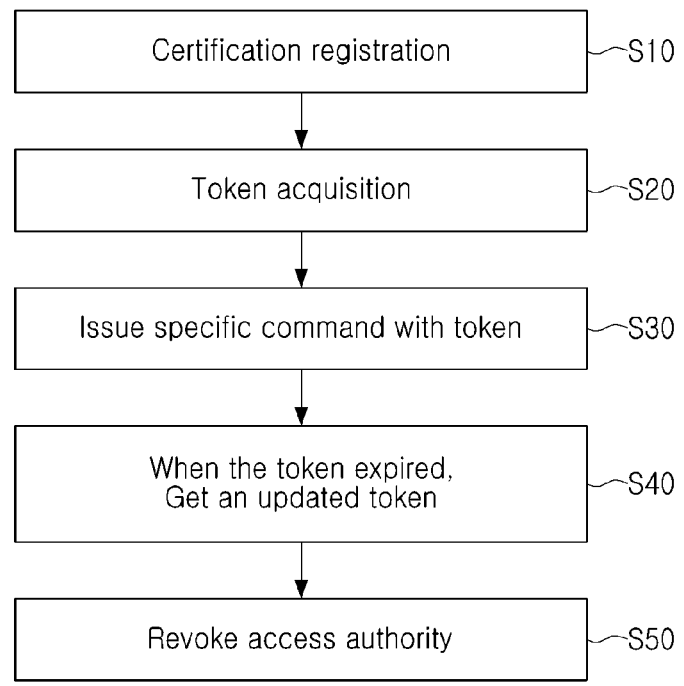
FIG. 3 is a flowchart schematically illustrating an operation of a host-storage system according to an example embodiment.

FIG. 3 is a flowchart schematically illustrating an operation of a host-storage system according to an example embodiment.

In operation S10, the administrator may perform certificate registration. In detail, the host may perform certificate registration by storing the administrator's certificate in the storage device. The certificate includes a public key paired with a private key of the administrator. When the certificate registration is completed, the storage device may verify the signature of the administrator using the public key included in the certificate. The operation of operation S10 will be described in more detail with reference to FIGS. 4 to 5.

In operation S20, the administrator may obtain a token from the storage device. In detail, the host may provide a token request signature signed by the administrator's private key to the storage device in the token request message. The token message may be a message for requesting access to a specific command from a specific user. When it is verified that the signature is a signature by a legitimate administrator, the storage device may issue a token and a token secret key to provide to the administrator. At the host, the administrator may pass the token and token secret key to the specific user. The operation of operation S20 will be described in more detail with reference to FIGS. 6 to 8C.

In operation S30, the user may issue a specific command to the storage device together with the token received from the admin manager. In detail, the host may encrypt a message including the user's token and a specific command with the token secret key received from the admin manager and provide the encrypted message to the storage device. The storage device may verify the validity of the token by decrypting the message from the host with the token secret key. When the validity of the token is verified, the storage device may determine whether the token is a token that has been received from a legitimate user and may allow execution of the command, and may execute the command according to the determination result. The operation of operation S30 will be described in more detail with reference to FIGS. 9 to 11.

In addition, a lifetime may be set for the token. For example, when the token is used more than a predetermined number of times, the existing token may expire, and the storage device may generate a new token. In operation S40, the user may obtain an updated token from the storage device by requesting the updated token from the storage device. The operation of operation S40 will be described in more detail with reference to FIGS. 12 to 13.

If necessary, the administrator may revoke the user's access authority in operation S50. In detail, in order to revoke the access authority granted for a specific command to the host specific user, a signature for revoking the access authority, which is signed with the administrator's private key, may be provided to the storage device. When it is verified that the signature is a signature by a legitimate administrator, the storage device may remove the token issued to the user or limit the range of commands that may be executed with the token. The operation of operation S50 will be described in detail with reference to FIGS. 14 to 15.

Figure 4:
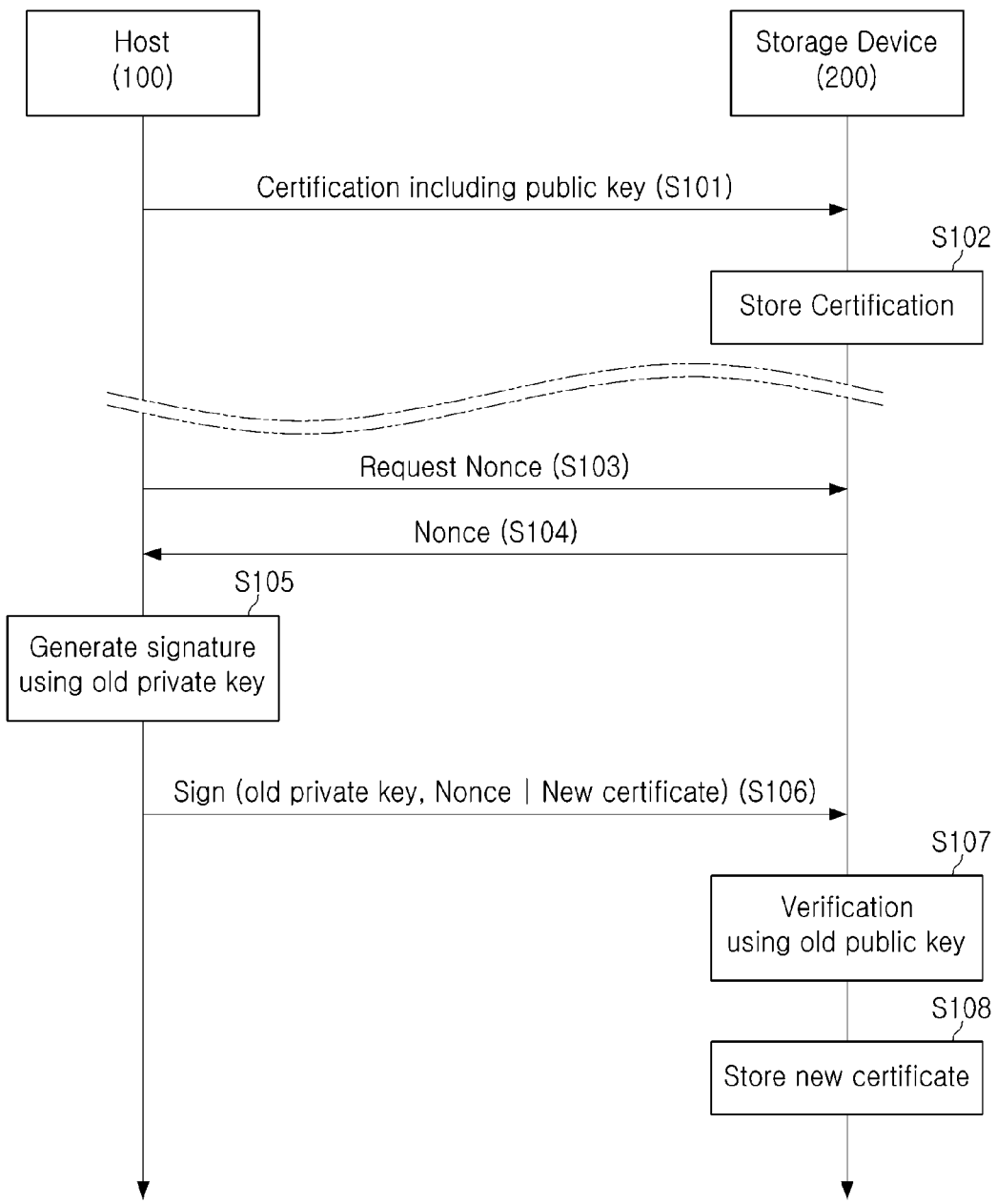
FIGS. 4 and 5 are diagrams illustrating, in greater detail, the operation of the host-storage system for certificate registration in operation S10.
Figure 5:
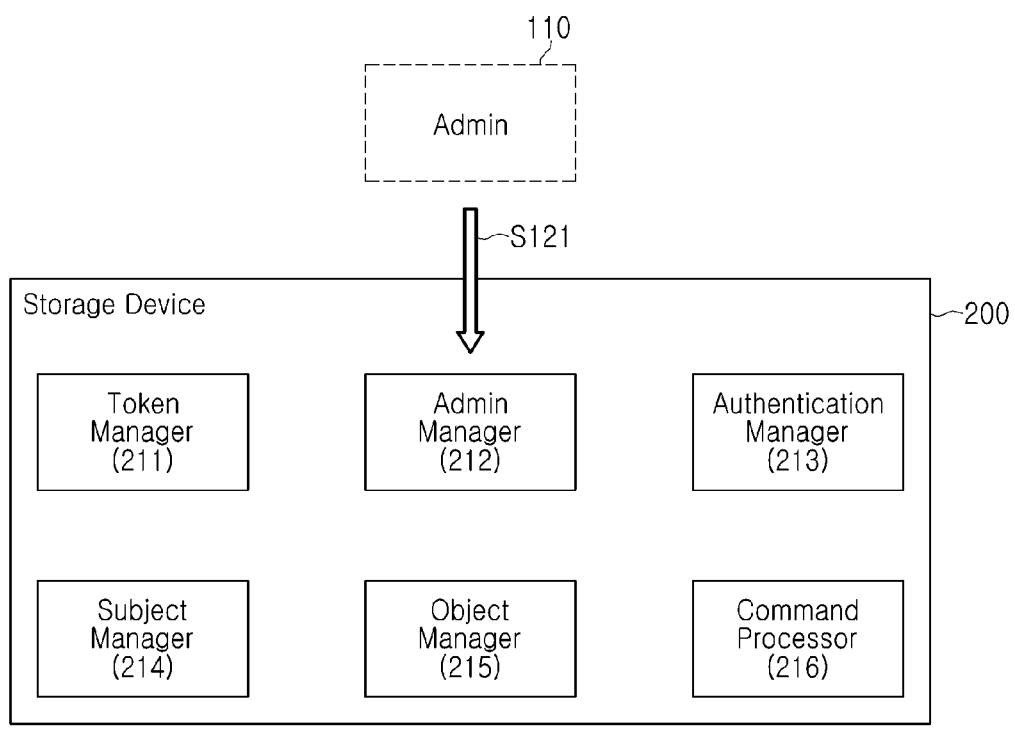

FIGS. 4 to 5 are diagrams illustrating, in greater detail, the operation of the host-storage system for certificate registration in operation S10.

FIG. 4 is a flowchart illustrating the interaction between the host 100 and the storage device 200 for certificate registration.

Operations S101 and S102 represent operations when a certificate is first registered in the storage device 200. In detail, the host 100 may provide the administrator's certificate to the storage device 200 in operation S101. The certificate includes a public key paired with a private key of the administrator. Then, the storage device 200 may complete certificate registration by storing the certificate from the host 100 in operation S102.

Operations S103 to S108 represent operations when a certificate is replaced after a certificate is registered in the storage device 200. In order to prevent a problem in which an administrator without legitimate authority replaces a certificate without permission, the storage device 200 may replace a certificate only when a certificate replacement request from the host 100 is signed by a legitimate administrator.

In detail, the host 100 may request a nonce from the storage device 200 in operation S103. The nonce may be one-time data used to verify the administrator's signature. In operation S104, the storage device 200 may generate a random value made of alphanumeric characters in response to the request of the host 100, and transmit the generated value to the host 100 as a nonce.

In operation S105, the host 100 may generate a certificate replacement signature using the private key included in the existing certificate, for example, the old private key. In detail, the host 100 may generate a signature, by encrypting a message in which the nonce obtained from the storage device 200 and the new certificate are concatenated, using the old private key.

In operation S106, the host 100 may provide the generated signature to the storage device 200.

In operation S107, the storage device 200 may verify the signature by using an old public key included in the existing certificate. In detail, when the storage device 200 normally recovers the nonce and the new certificate by decrypting the signature using the old public key, it may be verified that a legitimate administrator who previously provided the certificate provided the signature.

In operation S108, the storage device 200 may replace the certificate by storing a new certificate included in the decrypted signature.

FIG. 5 is a diagram for explaining an internal operation of the storage device 200 for certificate registration.

The operation of the storage device 200 for certificate registration described in FIG. 4 may be performed by the admin manager 212. For example, operation S121 represents that the certificate of the administrator 110 is transferred to the admin manager 212. The admin manager 212 may store the certificate of the administrator 110 in the storage device 200.

According to an example embodiment, once the certificate of the administrator 110 is registered, the storage device 200 may allow only a legitimate administrator to re-register the certificate. Accordingly, the security of the storage device 200 may be improved.

FIGS. 6 to 8C are diagrams illustrating, in greater detail, the operation of the host-storage system for acquiring the token in operation S20.

Figure 6:
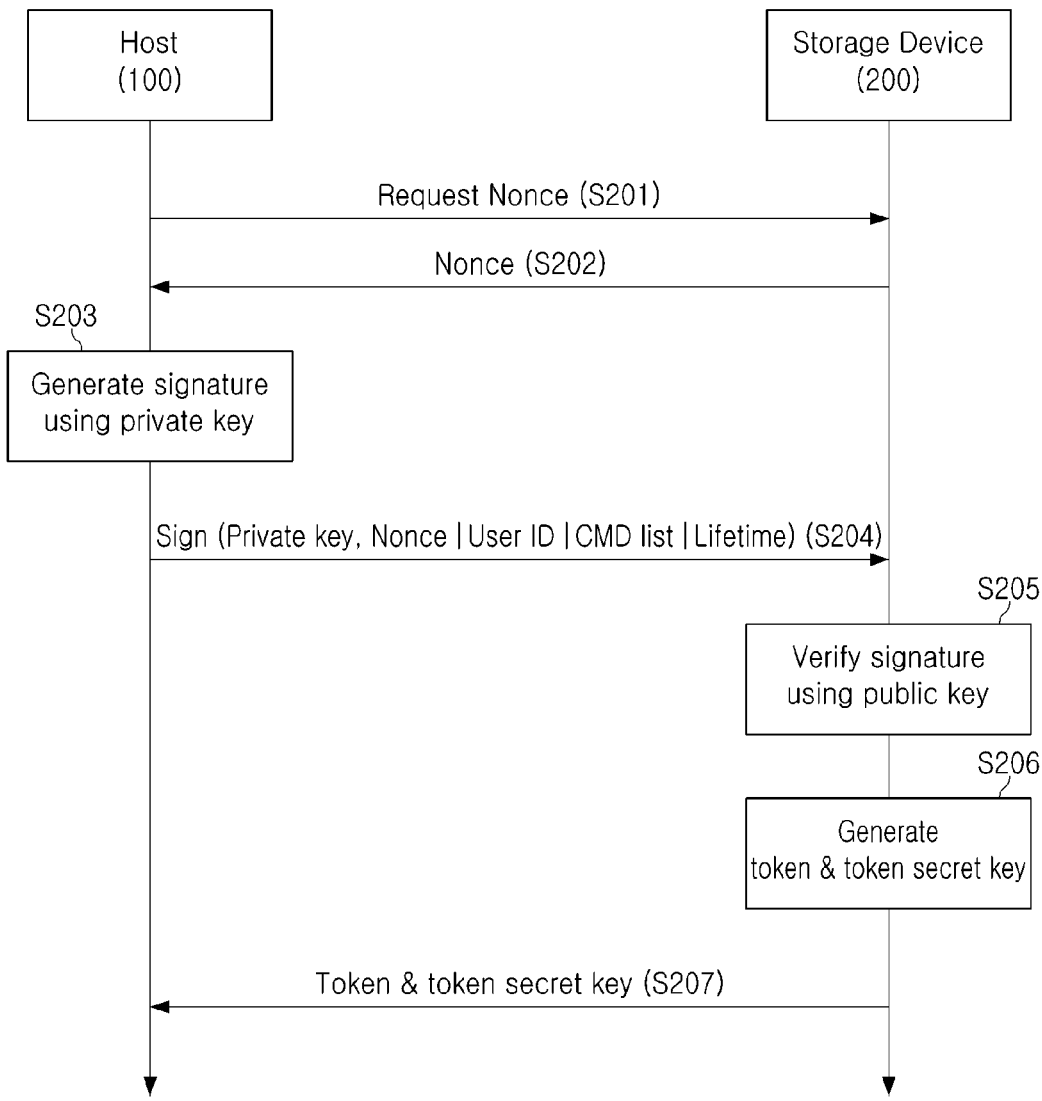

FIG. 6 is a flowchart illustrating the interaction between the host 100 and the storage device 200 for token acquisition.

In operation S201, the host 100 may request a nonce from the storage device 200. In operation S202, the storage device 200 may provide a nonce in response to the request of the host 100.

In operation S203, the host 100 may generate a signature for the token request using the admin manager's private key. In detail, the host 100 may generate a signature to request a token that allows one or more commands from a particular user. The host 100 may generate a signature for a token request by signing a message concatenated with a nonce, a user ID, an allowed command list, and lifetime information using a private key.

The user ID may be an ID for identifying a specific user, and the allowed command list may include information on one or more commands to be allowed to be executed by the specific user. The lifetime information may indicate the validity period of the token. For example, the lifetime information may indicate the number of times the token may be used. The lifetime information may also indicate a duration of time (e.g., a temporal period) in which the token may be used.

In operation S204, the host 100 may provide the generated signature for the token request to the storage device 200.

In operation S205, the storage device 200 may verify the signature using the public key included in the certificate. In detail, the storage device 200 may decrypt the signature using the public key. When the storage device 200 obtains a signature from a legitimate administrator, the nonce included in the decrypted signature may be the same as the nonce provided with the storage device 200 in operation S202. When it is verified that the nonces are identical to each other, the storage device 200 may successfully acquire the user ID, the allowed command list, and the lifetime information.

In operation S206, the storage device 200 may generate a token and a token secret key. The token may allow a specific user having the user ID to execute a command included in the allowed command list. The token secret key may be used to decrypt a message including the token.

In operation S207, the storage device 200 may provide a token and a token secret key to the host 100. Depending on the implementation, the token and the token secret key may be encrypted using a public key or the like and provided to the host 100.

The storage device 200 may issue tokens for users only to a legitimate administrator who has registered a certificate. Accordingly, the security of the storage device 200 may be improved.

Figure 7:
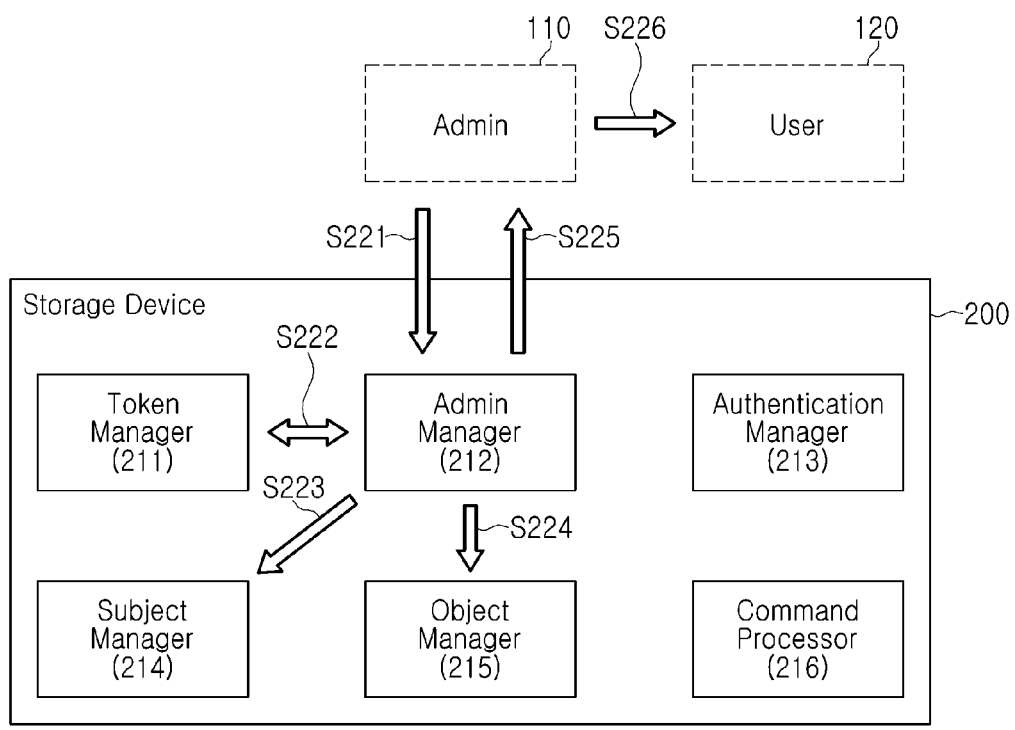

FIG. 7 is a diagram for explaining an internal operation of the storage device 200 for acquiring a token. FIGS. 8A to 8C are diagrams illustrating data that may be stored in the storage device 200 by an internal operation of the storage device 200.

The admin manager 212 may verify the signature for token acquisition by the administrator 110 in operation S221. Operation S221 may correspond to operation S204 of FIG. 6.

When the signature is verified, the admin manager 212 may provide a token and token secret generation request to the token manager 211. The token manager 211 may generate a token and a token secret paired with the token in response to a token and token secret generation request, and may provide it to the admin manager 212. Operation S222 represents an operation in which the admin manager 212 and the token manager 211 exchange a request and a response.

The token manager 211 may also generate one or more tokens in response to the token acquisition signature of the administrator 110 and manage the generated tokens. The token manager 211 may store token-related information in the storage device 200 to manage the generated token.

FIG. 8A illustrates a token list that the token manager 211 may store. The token list may include a token, a token secret key corresponding to the token, and lifetime information of the token. For example, token 'A' may have a corresponding token secret key 'a'. Token 'A' may be a one-time token with lifetime '1'.

Referring back to FIG. 7, the admin manager 212 may provide a token and a user ID to the subject manager 214 in operation S223. The subject manager 214 may manage user ID information for each token so that the token may be effectively used only by a specific user. The subject manager 214 may generate a user list indicating user ID information for each token and store it in the storage device 200.

FIG. 8B illustrates a user list. The user list may include a token and a user ID corresponding to the token. For example, the token 'A' may be effectively used by the first user (User1). If the second user User2 is somehow able to obtain the token 'A' and provides a command together with the stolen token 'A', the subject manager 214 may refuse to execute the command.

Referring back to FIG. 7, the admin manager 212 may provide a token and a list of allowed commands to the object manager 215 in operation S224. The object manager 215 may manage permitted command information for each token so that the token allows execution of a command included in the permitted command list. The object manager 215 may generate an allowed command list (e.g., a Permissible CMD list as illustrated in FIG. 8C) indicating allow command information for each token and store it in the storage device 200.

FIG. 8C illustrates a Permissible CMD list. The allowed command list may include a token and one or more commands allowed by the token. For example, token 'A' may allow execution of first, second and fifth commands CMD1, CMD2 and CMD5. For example, when the third command CMD3 is provided together with the token 'A', the object manager 215 may reject the execution of the third command CMD3.

Referring back to FIG. 7, the admin manager 212 may provide a token and a token secret key to the administrator 110 in operation S225. In operation S226, the administrator 110 may deliver the token and the token secret key to the specific user 120. The user 120 may request the storage device 200 to execute an allow command using the token and the token secret key.

Figure 9:
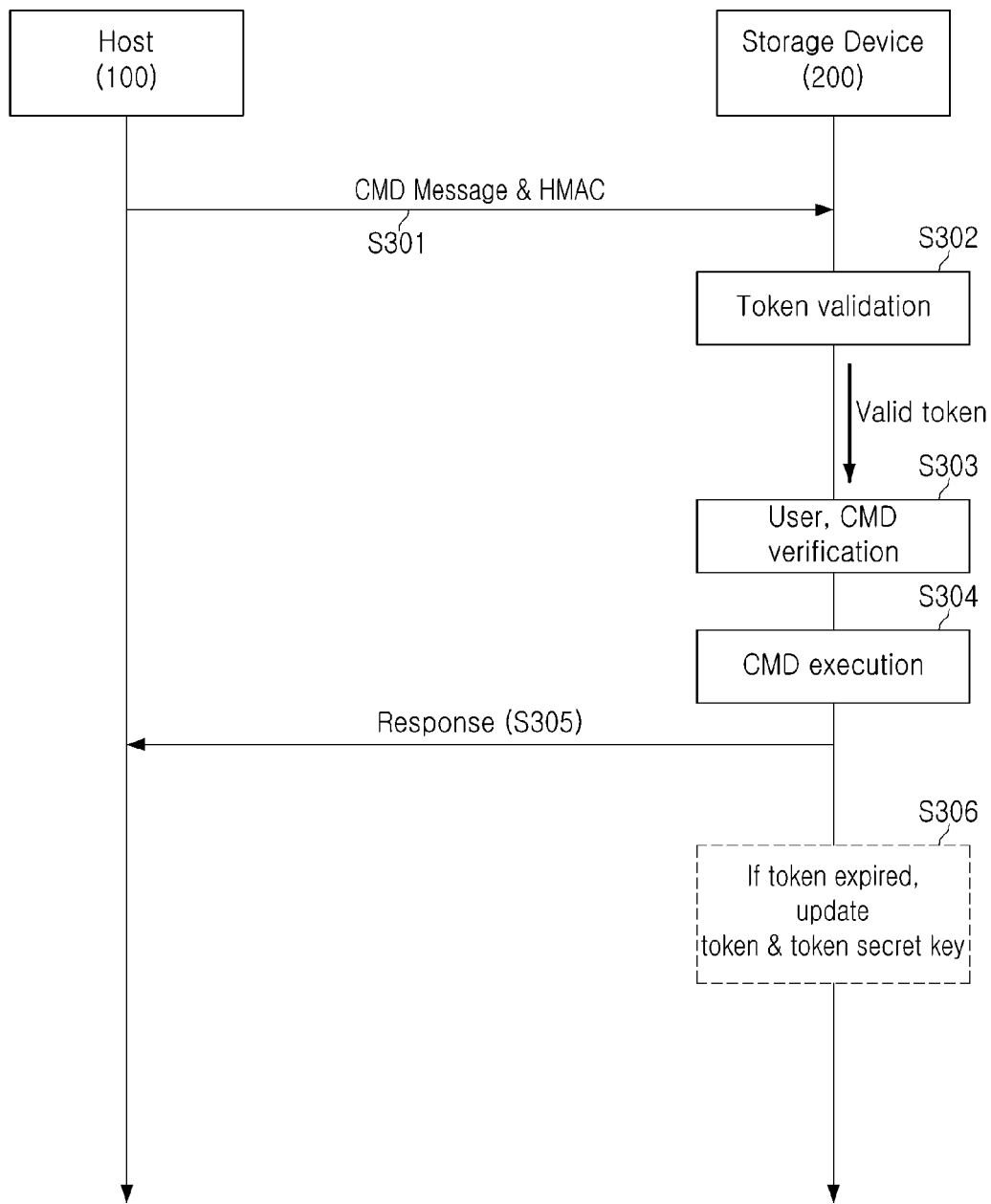
FIGS. 9 to 11 are diagrams illustrating, in greater detail, the operation of the host-storage system related to the command issuance in operation S30.
Figure 10:
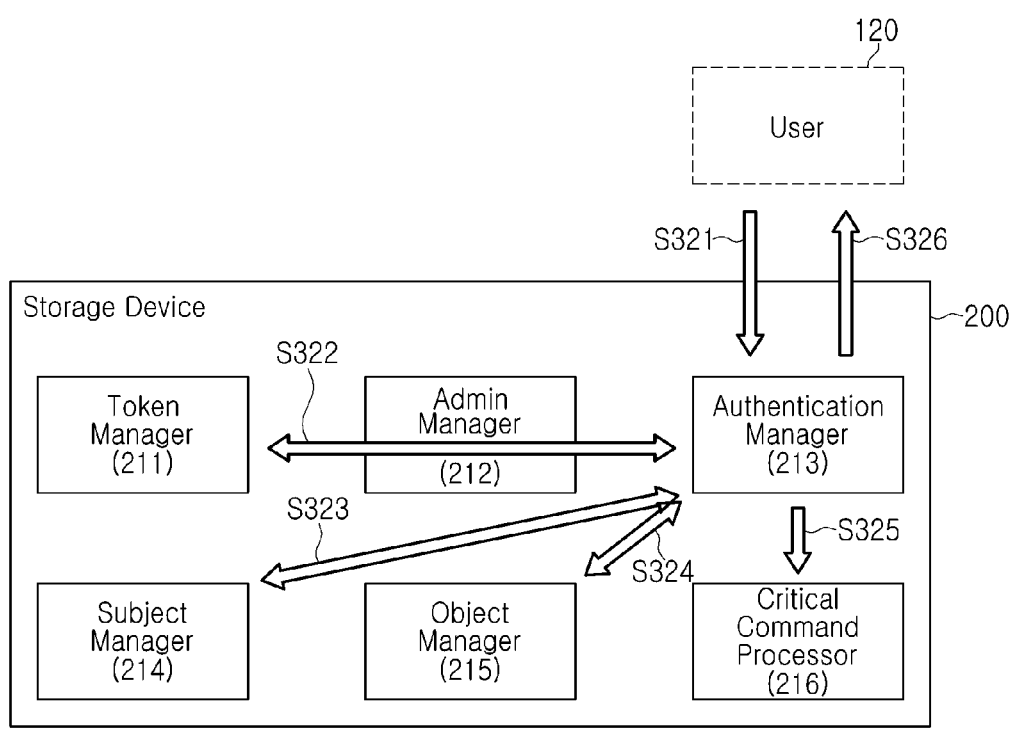
Figure 11:
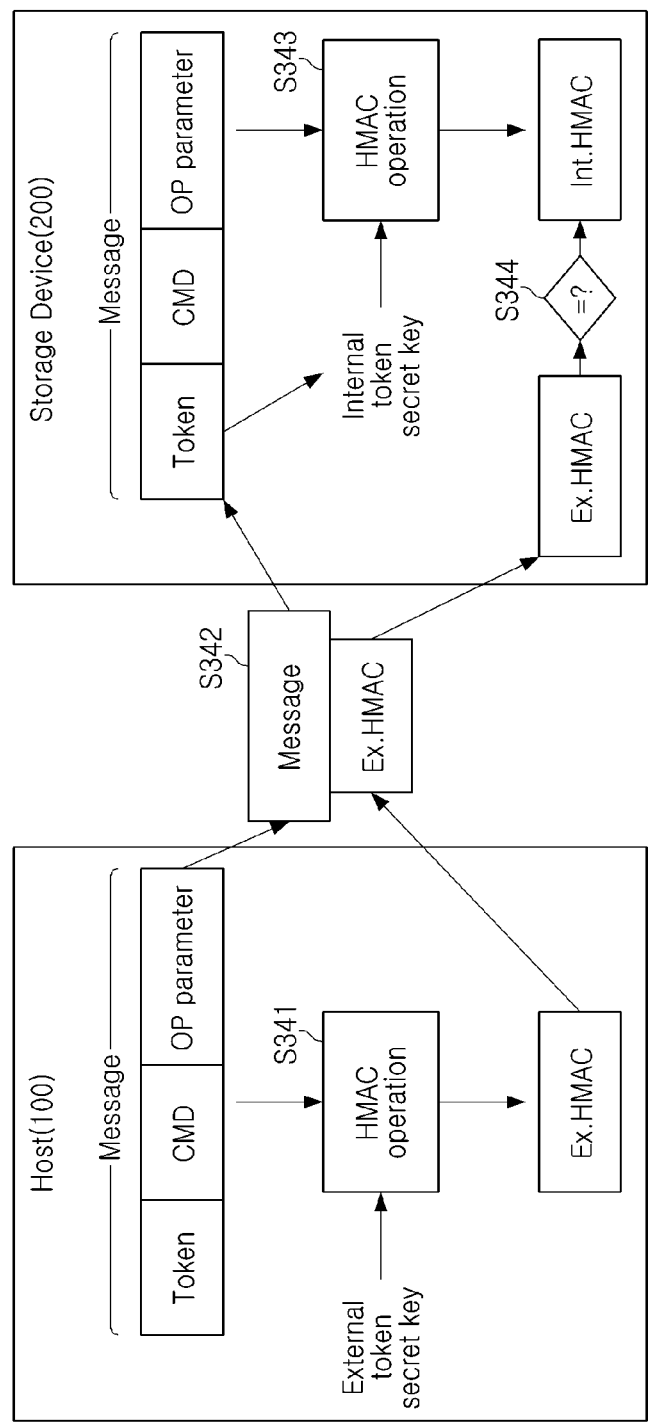

FIGS. 9 to 11 are diagrams illustrating, in greater detail, the operation of the host-storage system related to the command issuance in operation S30.

FIG. 9 is a flowchart illustrating the interaction between the host 100 and the storage device 200 related to issuing a command.

In operation S301, the host 100 may issue a command by providing a command message (CMD Message) and hash-based message authentication code (HMAC) of a specific user to the storage device 200. In detail, a command message may be generated by concatenating a token, a command, and an operation parameter. The authentication code may be generated by encrypting the command message with a token secret key.

In operation S302, the storage device 200 may authenticate the validity of the token included in the command message from the host 100. In detail, the storage device 200 may generate an authentication code by encrypting the command message using a token secret key corresponding to the token included in the command message, and may verify the validity of the token by determining whether the authentication code received from the host 100 matches with the generated authentication code or not. For example, when the authentication code received from the host 100 matches with the generated authentication code generated by the storage device 200, token is deemed to be valid (i.e., a valid token).

When it is determined in operation S302 that the token is authenticated as a valid token, the storage device 200 may further verify whether the user has the authority to use the token in operation S303 and whether the token has the authority to execute a command included in the command message.

When the user has legitimate authority to execute the command using the token, the storage device 200 may execute the command in operation S304. In operation S305, the storage device 200 may provide a response to the command message to the host 100.

Additionally, as described with reference to FIG. 8A, the token may have a lifetime. For example, when the token is used a predetermined number of times, the token may expire. In operation S306, when it is determined that the token has expired as a result of executing the command, the storage device 200 may update the token and the token secret key.

For example, in order to update the token, the storage device 200 may generate a string obtained by concatenating a salt value to an existing token, and may generate an updated token by performing a hash operation on the string. The salt value may be a value uniquely determined for each storage device 200. The storage device 200 may generate an updated token secret key by generating a random string. The updated token and the updated token secret key may correspond in a one-to-one manner.

FIG. 10 is a diagram for explaining an internal operation of the storage device 200 related to issuing a command. FIG. 11 is a diagram for explaining in detail an operation of authenticating a token according to issuance of a command.

In operation S321, the command message and the authentication code of the user 120 may be provided to the authentication manager 213. The authentication manager 213 may obtain a token secret key corresponding to the token included in the command message from the token manager 211 in operation S322, and use the token secret key to authenticate the validity of the token.

Referring to FIG. 11, a method in which the host 100 generates a command and an authentication code of a user and a method in which the storage device 200 authenticates a token based on the command and the authentication code will be described in detail.

In detail, the host 100 may generate a command message including a token of a specific user, a command, and an operation parameter.

In operation S341, the host 100 may generate an authentication code by performing an HMAC operation for generating a hash-based message authentication code (HMAC). The HMAC operation may refer to a hash operation performed on a command message using a token secret key. The token secret key may correspond to a token included in the command message. The token secret key used by the host 100 may be referred to as an external token secret key to distinguish it from the token secret key stored inside the storage device 200. The authentication code generated by the host 100 may be referred to as an external authentication code (Ex.HMAC).

The host 100 may provide the command message and the external authentication code to the storage device 200 in operation S342.

The storage device 200 may use an external authentication code to authenticate the validity of the token included in the command message. In detail, the storage device 200 may find an internal token secret key corresponding to the user's token from the token list. The storage device 200 may generate an authentication code by performing an HMAC operation on the message using the internal token secret key in operation S343. The authentication code generated with the storage device 200 may be referred to as an internal authentication code (Int.HMAC) to distinguish the same from an external authentication code.

The storage device 200 may compare the external authentication code and the internal authentication code in operation S344. As a result of the comparison, when the external authentication code and the internal authentication code are the same, the storage device 200 may determine that the token included in the command message from the host 100 is a valid token.

Referring back to FIG. 10, in operation S323, the authentication manager 213 may provide the token and the user ID of the user 120 to the subject manager 214. The subject manager 214 may verify whether the user 120 is a legitimate user of the token by referring to the user list.

In operation S324, the authentication manager 213 may provide the token and command information included in the command message to the object manager 215. The object manager 215 may verify whether the token has the authority to execute the command by referring to the command list.

When the user 120 is a legitimate user of the token and the token has legitimate authority to execute the command, the authentication manager 213 may provide a command to the command processor 216 in operation S325. The command processor 216 may execute the command.

In operation S326, the authentication manager 213 may provide a response to the executed command to the user 120.

According to an example embodiment, the storage device 200 may allow the execution of the command after verifying whether the user has a legitimate right to use a specific command through token-based authentication. Since an unauthorized user cannot execute the specific command even if the unauthorized user is in possession of the token, the security of the storage device 200 may be improved.

Figure 12:
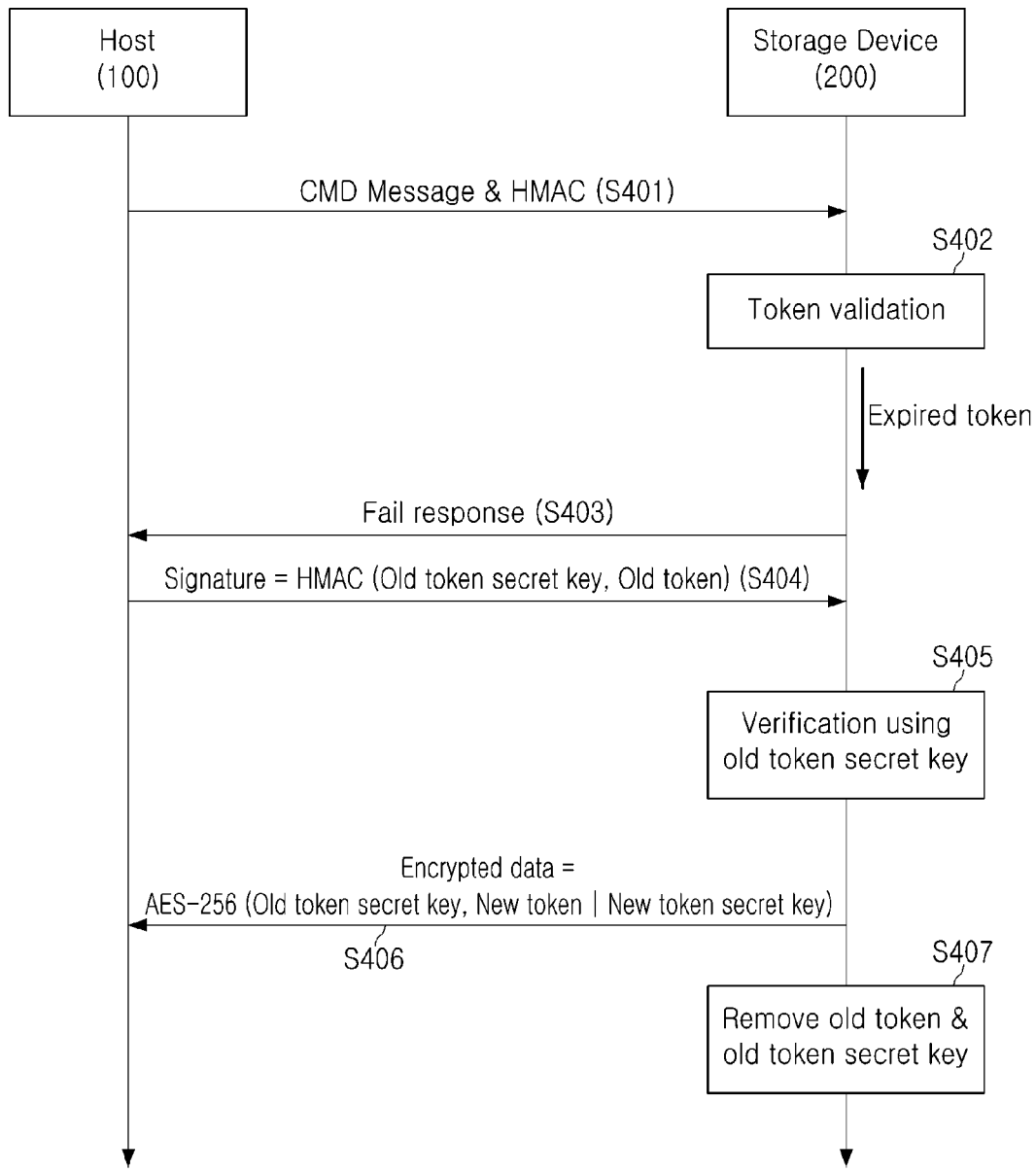
FIGS. 12 and 13 are diagrams illustrating, in greater detail, the operation of the host-storage system for acquiring the updated token in operation S40.
Figure 13:
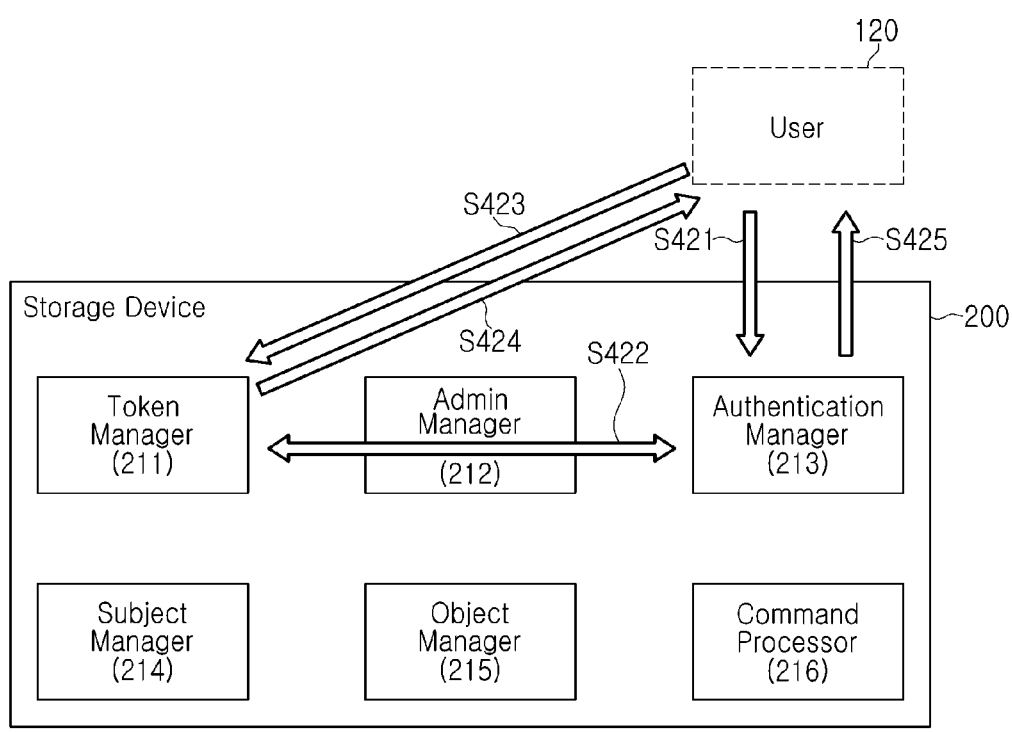

FIGS. 12 and 13 are diagrams illustrating, in greater detail, the operation of the host-storage system for acquiring the updated token in operation S40.

FIG. 12 is a flowchart illustrating the interaction between the host 100 and the storage device 200 for obtaining an updated token.

Operations S401 and S402 may be the same as described with reference to operations S301 and S302 of FIG. 9. For example, when a legitimate user provides a command message and an authentication code to the storage device 200 in operation S401, but fails to validate the token in operation S402 and receives a fail response from the storage device 200 in operation S403, a legitimate user may determine that the token has expired and request an updated token and token secret key from the storage device 200.

In operation S404, the host 100 may provide an old token and a token update signature to the storage device 200 in order to request an updated token and token secret key. The signature for token update is a signature to prove that the user is a legitimate user, and may be generated by encrypting the old token using the old token secret key.

In operation S405, the storage device 200 may verify the signature using the old token secret key. For example, the storage device 200 generates an internal signature by encrypting the old token received from the host 100 using the old token secret key stored inside the storage device 200, and may verify the signature by comparing the internal signature and the signature received from the host 100.

When it is verified that the signature is a signature from a legitimate user, the storage device 200 may provide a new token and a new token secret key to the host 100 in operation S406. Depending on the implementation, the storage device 200 may provide the new token and the new token secret key to the user 120 after encryption using the old token secret key for security maintenance. FIG. 12 illustrates that the AES-256 algorithm is used for encryption as an example, but the present inventive concept is not limited thereto, and various algorithms may be used for encryption.

In operation S407, the storage device 200 may remove the old token and the old token secret key from the inside of the storage device 200.

FIG. 13 is a diagram for explaining an internal operation of the storage device 200 for obtaining an updated token.

In operation S421, the command message and the authentication code of the user 120 may be provided to the authentication manager 213. The authentication manager 213 may obtain a token secret key included in the command message from the token manager 211 in operation S422, and use the token secret key to authenticate the validity of the token.

When the command message is generated using the expired token of the user 120, the authentication manager 213 may determine that the token is invalid and provide a failure response to the user 120.

In operation S424, the old token of the user 120 and the signature for token update may be transmitted to the token manager 211. The token manager 211 may verify the old token and the signature for token update, and provide the new token and the new token secret key to the user 120.

According to an example embodiment, when the user 120 is a legitimate user, the updated token may be directly obtained without relying on the administrator 110 after the token expiration. After providing the updated token to the user 120, the storage device 200 may remove the old token from its internal storage, thereby preventing an unauthorized user from stealing a new token using the old token. Accordingly, the convenience of the user 120 may be increased while the security of the storage device 200 is maintained.

Figure 14:
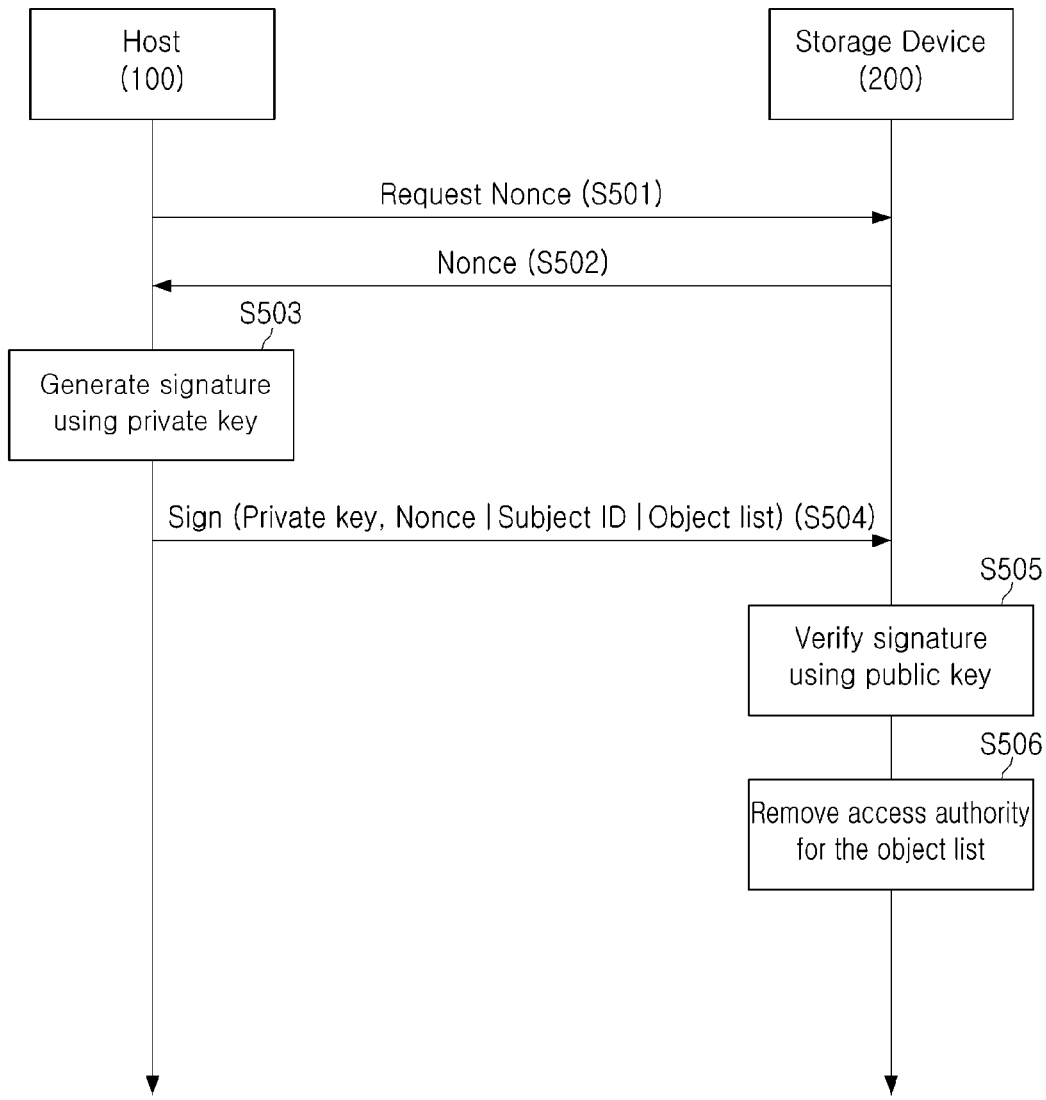
FIGS. 14 and 15 are diagrams illustrating, in greater detail, the operation of the host-storage system for revoking the access authority in operation S50.
Figure 15:
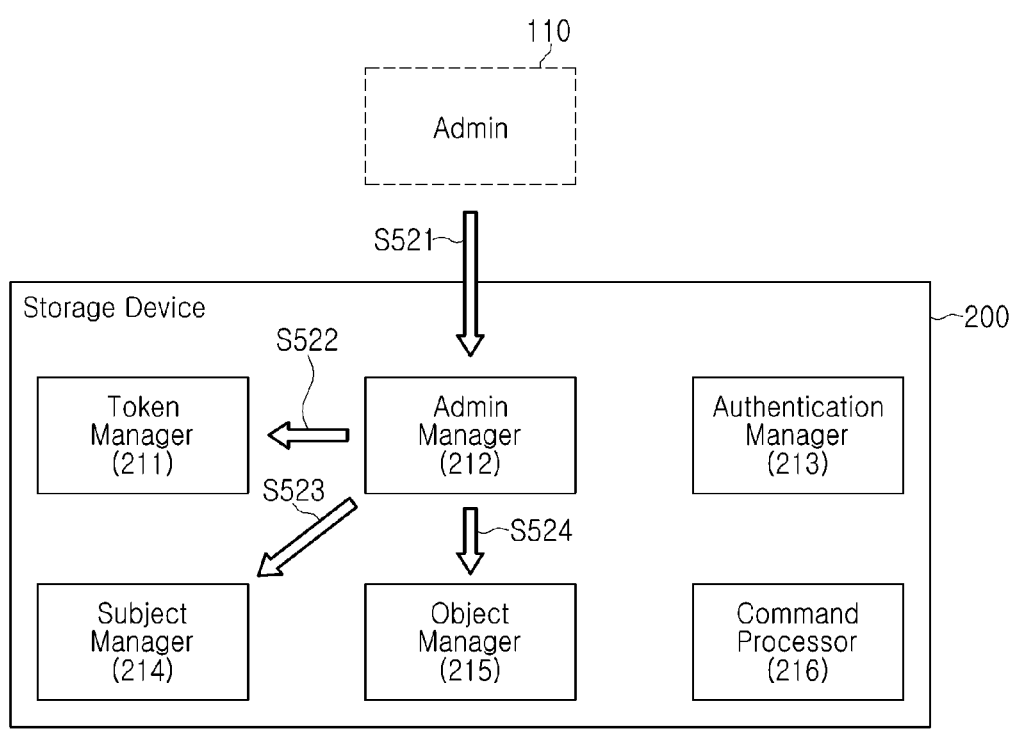

FIGS. 14 and 15 are diagrams illustrating, in greater detail, the operation of the host-storage system for revoking the access authority in operation S50.

FIG. 14 is a flowchart illustrating the interaction between the host 100 and the storage device 120 for access authority revoking.

In operation S501, the host 100 may request a nonce from the storage device 200. In operation S502, the storage device 200 may provide a nonce in response to the request of the host 100.

In operation S503, the host 100 may use the private key of the administrator 110 to generate a signature for access authority revoking. In detail, the host 100 may generate a signature by encrypting a message concatenated with a nonce, a user ID, and a revoking command list using a private key in order to revoke an access authority to a certain command granted to a specific user.

In operation S504, the host 100 may provide the generated signature to the storage device 200.

In operation S505, the storage device 200 may verify the signature using the public key included in the certificate. The method of verifying the signature is the same as that described with reference to operation S205 and the like.

In operation S506, the storage device 200 may revoke the specific user's access authority to the command included in the revoking command list by removing the specific user's access authority for the command.

FIG. 15 is a diagram for explaining an internal operation of the storage device 200 for revoking access to a command.

The admin manager 212 may verify the signature for access authority revoking, signed with the private key of the administrator 110 in operation S521. When the signature is verified, the admin manager 212 may revoke access to the command.

The administrator 110 may revoke access authority of all or some of the commands included in the allowed command list of a specific user. When access authority of all commands included in the allowed command list are revoked, the admin manager 212 may request the token manager 211 to remove the token and token secret key corresponding to the command from the token list in operation S522. Then, the admin manager 212 may request the subject manager 214 to remove the user ID corresponding to the token from the user list in operation S523, and may request the object manager 215 to remove all permitted commands corresponding to the token from the command list in operation S524.

When the access authority of some of the commands included in the allowed command list is revoked, the admin manager 212 may request the object manager 215 to remove only some commands from the command list in operation S524.

According to an example embodiment, when a security problem such as a token leak occurs, the storage device 200 may revoke all or part of the access authority related to the token according to the request of the administrator 110. Accordingly, security of the storage device 200 may be improved.

Figure 16:
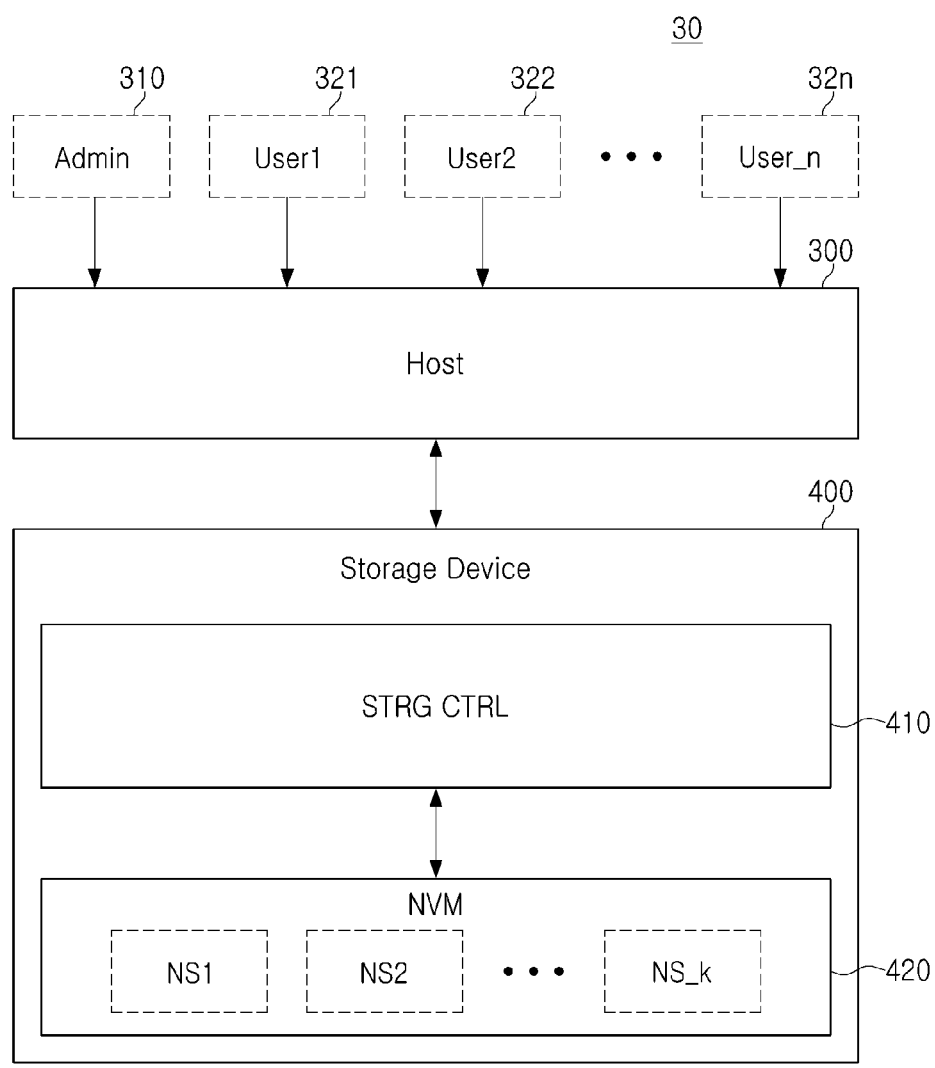
FIG. 16 is a block diagram illustrating a host-storage system according to an example embodiment.
Figure 17:
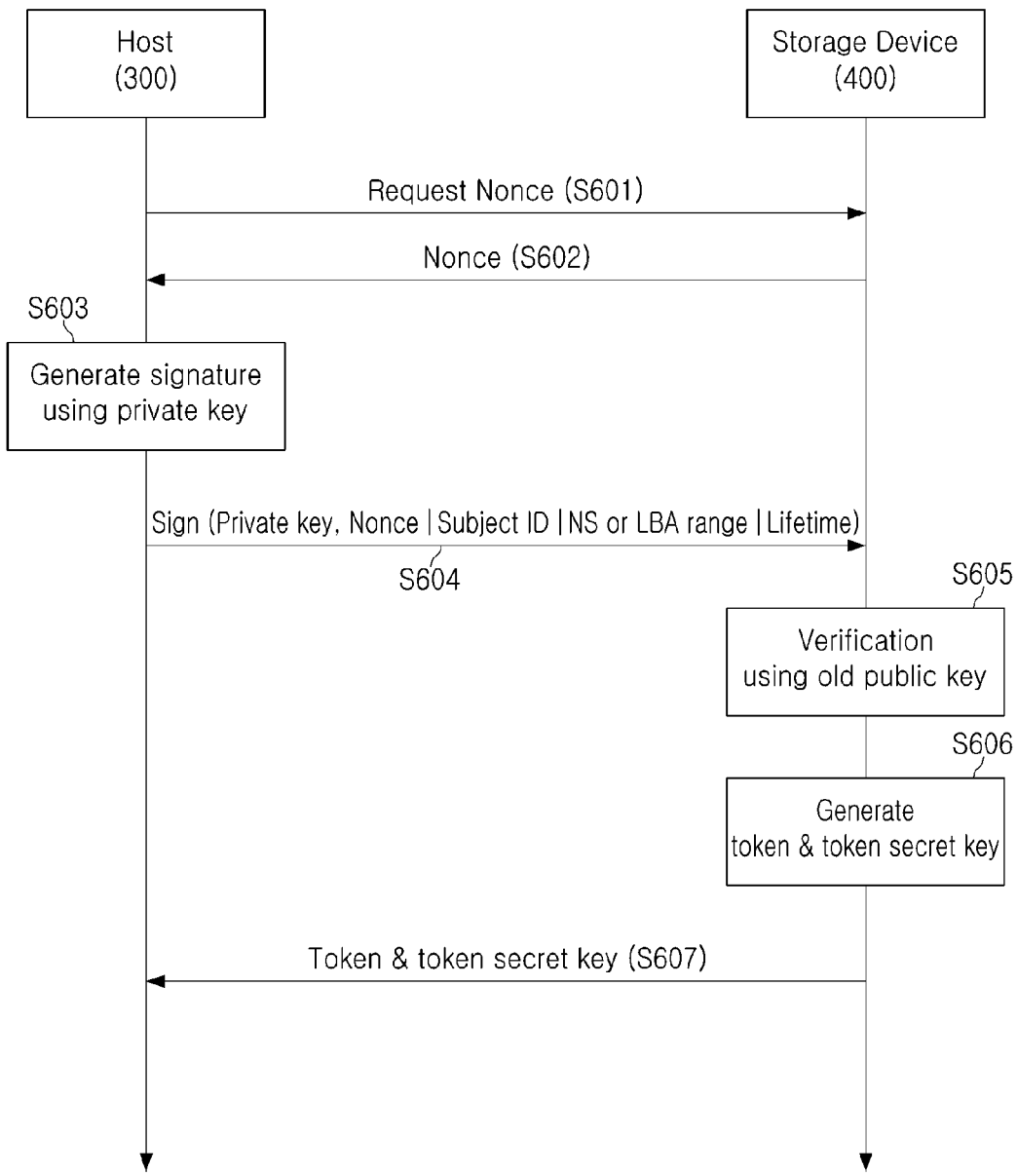
FIGS. 17 and 18 are flowcharts illustrating an operation of a host-storage device according to an example embodiment.
Figure 18:
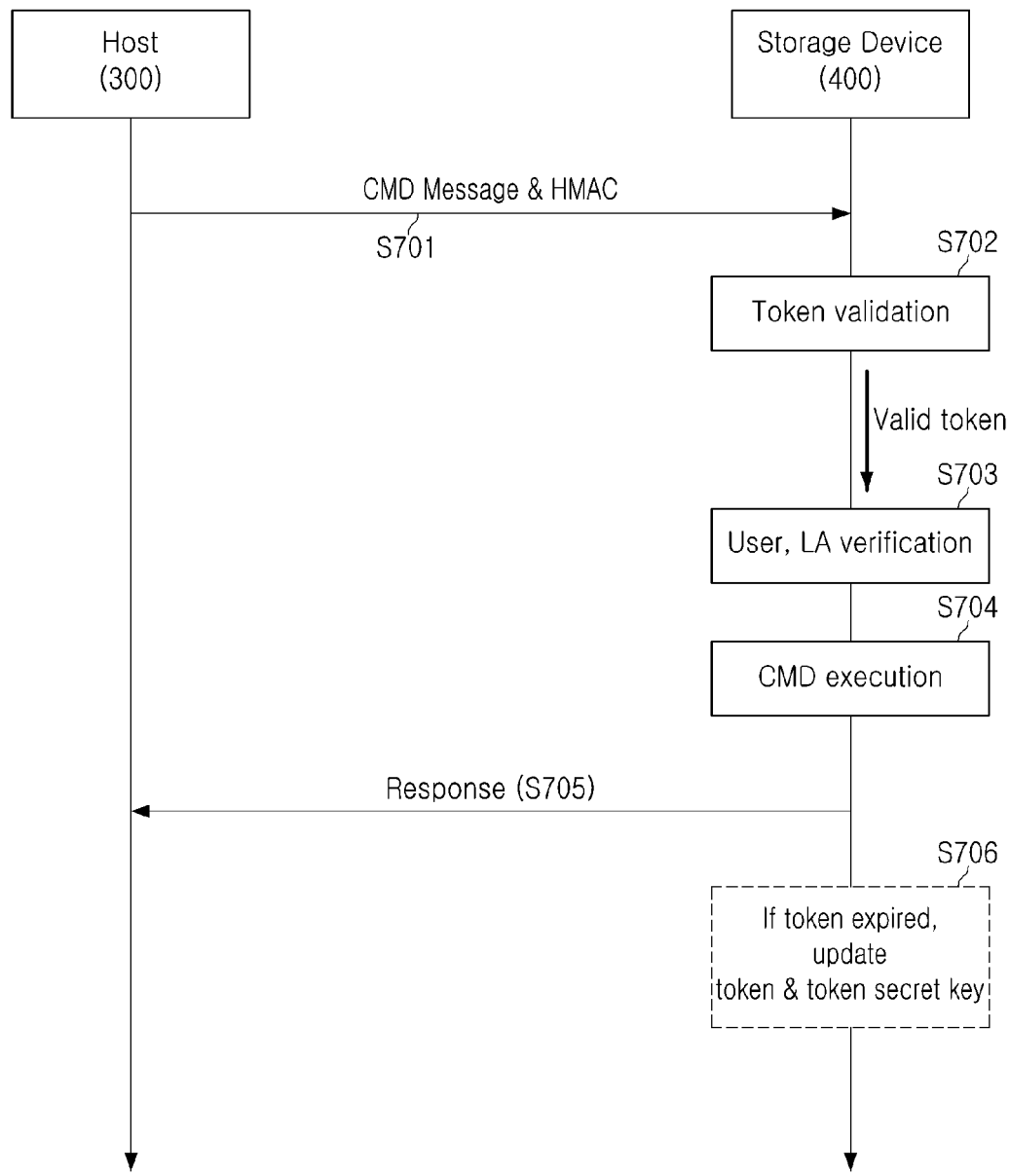

In the examples of FIGS. 1-7, 8A-8C, and 9-15, an embodiment in which the storage device restricts execution of a command through token-based authentication has been described in detail. However, aspects of the present inventive concept is not limited thereto. For example, the storage device may restrict command execution through token-based authentication, as well as further restrict a range of logical addresses that may be accessed through the corresponding command. In FIGS. 16 to 18, the operation of the host-storage system according to an example embodiment will be described in detail.

FIG. 16 is a block diagram illustrating a host-storage system according to an example embodiment.

The host-storage system 30 may include a host 300 and a storage device 400. The host 300 may be used by various users 321, 322, . . . , 32n, and may be managed by the administrator 310. A user 320 may correspond to any of the users 321, 322, . . . , 32n. In addition, the storage device 400 may include a storage controller 410 and a nonvolatile memory 420.

The host 300 and the storage device 400 may be similar to the host 100 and the storage device 200 described with reference to FIG. 1. Hereinafter, an example embodiment will be described focusing on the differences between the host 100 and the storage device 200 and the host 300 and the storage device 400.

The nonvolatile memory 420 may include a plurality of namespaces NS1, NS2, . . . , NS_k. The namespace may refer to a storage space in which the storage space provided by the nonvolatile memory 420 is logically divided. Each namespace may be recognized by the host 300 as a separate storage space in the storage device 400, and logical addresses may be independently allocated for each namespace.

According to an example embodiment, the storage device 400 may provide a specific user with permission to access a specific logical address area according to a request from the host 300.

FIGS. 17 and 18 are flowcharts illustrating an operation of a host-storage device according to an example embodiment.

FIG. 17 is a flowchart illustrating operations of the host 300 and the storage device 400 for token acquisition.

In operation S601, the host 300 may request a nonce from the storage device 400. In operation S602, the storage device 400 may generate a nonce in response to a request from the host 300 and provide the generated nonce to the admin manager 310.

In operation S603, the host 300 may generate a signature for the token request using the admin manager's private key. In detail, the host 300 may generate a signature to request a token that grants a specific user access to a specific logical address area. The host 300 may generate a signature for the token request by signing the message concatenated with the nonce, user ID, permitted logical area range, and lifetime information using the private key.

The permitted logical area range may refer to a range of a logical area to which access is to be permitted. For example, the allowable logical area range may be specified as one or more namespaces, or may be specified as a range of logical block addresses (LBA) used in the file system of the host 300.

In operation S605, the storage device 400 may verify the signature using the public key included in the certificate. When it is verified that the signature is the signature of a legitimate administrator, the storage device 400 may successfully obtain the user ID, allowed logical address range, and lifetime information.

In operation S606, the storage device 400 may generate a token and a token secret key. The token may allow a specific user with the user ID to access the allowed logical address area. The token secret key may be used to decrypt a message including the token.

In operation S607, the storage device 400 may provide a token and a token secret key to the host 300.

FIG. 18 is a flowchart illustrating operations of the host 300 and the storage device 400 related to issuing a command.

In operation S701, the host 300 may issue a command by providing a command message and an authentication code of a specific user (e.g., a user 320) to the storage device 400. In detail, the command message may be generated by concatenating the logical addresses to be accessed (LA: Logical Addresses), using the user's token, command, and the command. The authentication code may be generated by encrypting the command message with a token secret key.

In operation S702, the storage device 400 may authenticate the validity of the token included in the command message from the host 300. The storage device 400 may authenticate the validity of the token in a manner similar to that described with reference to FIG. 11. For example, the storage device 400 may generate an internal authentication code by using an internal token secret key corresponding to the token included in the command message in the token list, and may determine whether the token is valid by comparing the generated internal authentication code with the authentication code from the user 320.

As a result of determination in operation S702, when the token is authenticated as a valid token, the storage device 400 may further verify whether the user has authority to use the token in operation S703, and whether the token has authority to access the logical address.

The storage device 400 may execute the command in operation S704 when the user has a legitimate right to access the logical address by using the token.

In operation S705, the storage device 400 may provide a response to the command message to the host 300.

Similar to that described with reference to FIG. 8A, the token may have a lifetime. For example, when the token is used a predetermined number of times, the token may expire. In operation S706, when it is determined that the token has expired as a result of executing the command, the storage device 400 may update the token and the token secret key.

The embodiment described with reference to FIGS. 1-7, 8A-8C, and 9-15 and the embodiment described with reference to FIGS. 16-18 may be combined with each other. For example, the storage device may issue a token that allows a specific user to access a logical address area of a predetermined range by using a specific command in response to a request of an administrator. The token may allow a specific user to execute a plurality of commands, and may allow access to a different logical address range for each command.

According to the embodiments of the present inventive concept described with reference to FIGS. 1-7, 8A-8C, and 9-18, the storage device may restrict execution of a command or access to the logical address area by performing token-based authentication to only legitimate users. Accordingly, the security of the storage device may be improved.

Hereinafter, an example of a system to which the present inventive concept may be applied will be described with reference to FIGS. 19 and 20.

Figure 19:
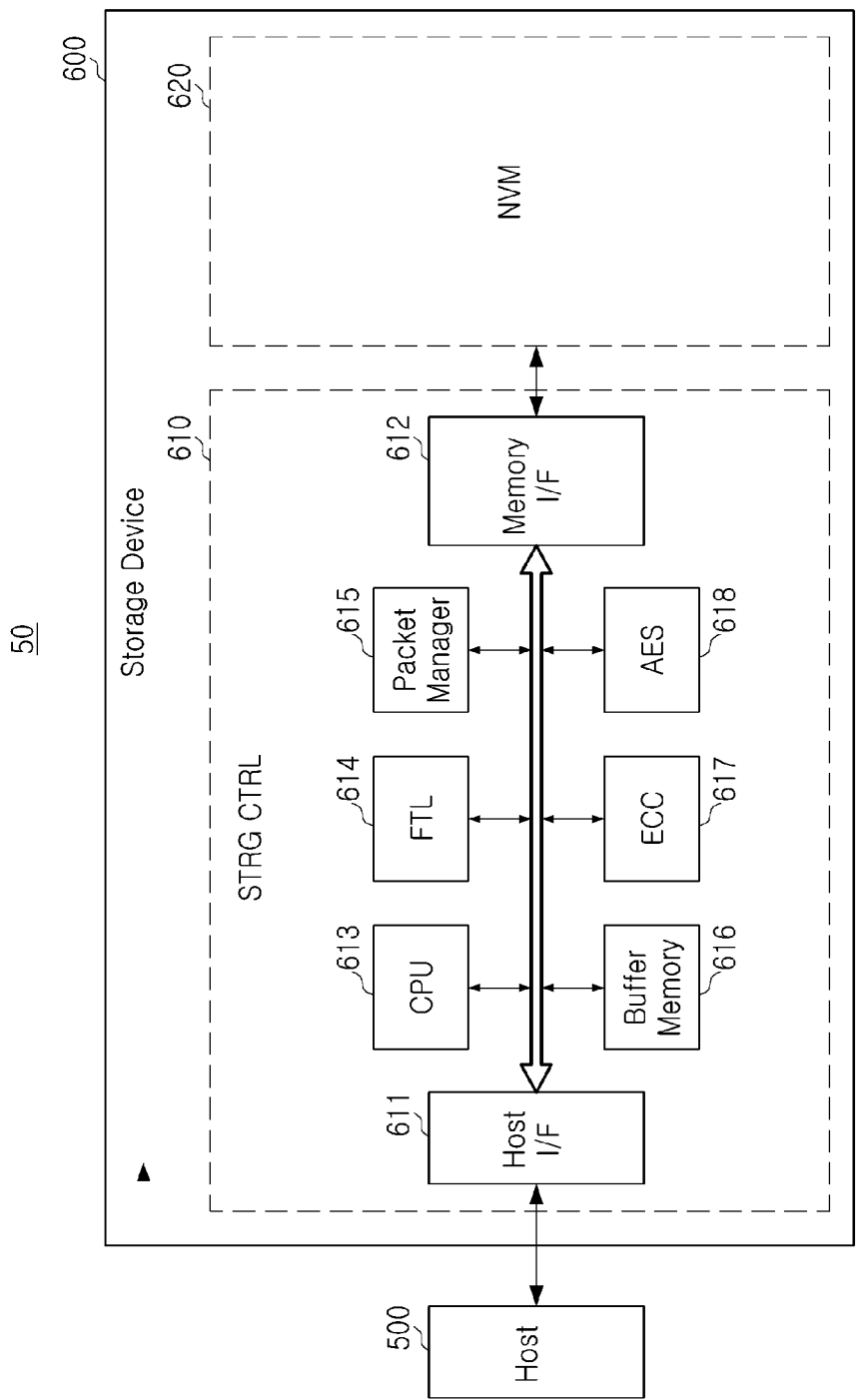
FIGS. 19 and 20 illustrate an example of a system to which the present inventive concept may be applied.

FIG. 19 is a block diagram illustrating a host-storage system 50 according to an example embodiment.

The host-storage system 50 may include a host 500 and a storage device 600. Also, the storage device 600 may include a storage controller 610 and a nonvolatile memory (NVM) 620.

The storage device 600 may include storage media for storing data according to a request from the host 500. As an example, the storage device 600 may include at least one of a solid state drive (SSD), an embedded memory, and a removable external memory. When the storage device 600 is an SSD, the storage device 600 may be a device conforming to a nonvolatile memory express (NVMe) standard. When the storage device 600 is an embedded memory or an external memory, the storage device 600 may be a device conforming to a universal flash storage (UFS) or an embedded multi-media card (eMMC) standard. The host 500 and the storage device 600 may each generate a packet according to an adopted standard protocol and transmit it.

When the nonvolatile memory 620 of the storage device 600 includes a flash memory, the flash memory may include a 2D NAND memory array or a 3D (or vertical) NAND (VNAND) memory array. As another example, the storage device 200 may include other various types of nonvolatile memories. For example, Magnetic RAM (MRAM), Spin-Transfer Torgue MRAM, Conductive bridging RAM (CBRAM), Ferroelectric RAM (FeRAM), Phase RAM (PRAM), Resistive RAM, and various other types of memory may be applied to the storage device 200.

According to an embodiment, the host 50 may include a controller (i.e., a host controller) and a memory (i.e., a host memory). The host controller and the host memory may be implemented as separate semiconductor chips. Alternatively, in some embodiments, the host controller and the host memory may be integrated on the same semiconductor chip. As an example, the host controller may be any one of a plurality of modules provided in an application processor, and the application processor may be implemented as a system on chip (SoC). In addition, the host memory may be an embedded memory provided in the application processor, or may be a nonvolatile memory or a memory module disposed outside the application processor.

The host controller may store data (e.g., write data) in the buffer area of the host memory in the nonvolatile memory 620, or may manage an operation of storing data (e.g., read data) of the nonvolatile memory 620 in the buffer area.

The storage controller 610 may include a host interface 611, a memory interface 612, and a central processing unit (CPU) 613. In addition, the storage controller 610 may further include a Flash Translation Layer (FTL) 614, a packet manager 615, a buffer memory 616, an error correction code (ECC) 617 engine and advanced encryption standard (AES) engine 618. The storage controller 610 may further include a working memory (not illustrated) into which the flash translation layer (FTL) 614 is loaded, and may control data writing and reading operations to and from the nonvolatile memory 620 as the CPU 613 executes the flash translation layer.

The host interface 611 may transmit and receive packets to and from the host 500. A packet transmitted from the host 500 to the host interface 611 may include a command or data to be written to the nonvolatile memory 620, and the like. A packet transmitted from the host interface 611 to the host 500 may include a response to a command or data read from the nonvolatile memory 620. The memory interface 612 may transmit data to be written to the nonvolatile memory 620 to the nonvolatile memory 620 or receive data read from the nonvolatile memory 620. The memory interface 612 may be implemented to comply with a standard protocol such as a toggle or an Open NAND Flash Interface (ONFI).

The flash translation layer 614 may perform various functions such as address mapping, wear-leveling, and garbage collection. The address mapping operation is an operation of changing a logical address received from the host 500 into a physical address used to actually store data in the nonvolatile memory 620. The wear-leveling is a technique for preventing excessive deterioration of a specific block by ensuring that blocks in the nonvolatile memory 620 are used uniformly. For example, the wear-leveling may be implemented through a firmware technique that balances erase counts of physical blocks. The garbage collection is a technique for securing usable capacity in the nonvolatile memory 620 by copying valid data of a block to a new block and then erasing the existing block.

The packet manager 615 may generate a packet according to the protocol of the interface negotiated with the host 500 or parse various information from the packet received from the host 500. Also, the buffer memory 616 may temporarily store data to be written to the nonvolatile memory 620 or data to be read from the nonvolatile memory 620. The buffer memory 616 may be provided in the storage controller 610, but may be disposed outside the storage controller 610.

The ECC engine 617 may perform an error detection and correction function on read data read from the nonvolatile memory 620. For example, the ECC engine 617 may generate parity bits for write data to be written into the nonvolatile memory 620, and the generated parity bits may be stored in the nonvolatile memory 620 together with the write data. When reading data from the nonvolatile memory 620, the ECC engine 617 corrects an error in the read data using parity bits read from the nonvolatile memory 620 together with the read data, and may output the error-corrected read data.

The AES engine 618 may perform at least one of an encryption operation and a decryption operation on data input to the storage controller 610 using a symmetric-key algorithm.

According to an example embodiment, the storage device 600 may restrict execution of a specific command received from the host 500 through token-based authentication to a specific user. The storage device 600 may run one or more firmware for issuing a token and performing token-based authentication. For example, the firmware may be loaded into an operation memory (not illustrated) and driven by the CPU 613. In addition, the storage device 600 may store a token and a token secret key associated with the token, a user ID, a command list, and the like in the buffer memory 616.

According to an example embodiment, the storage device 600 may issue to the host 500 a token that is valid only for a specific user and has a predetermined lifetime. Even if the token is leaked, other users cannot use the token to execute a command, and the leaked token may provide excellent security according to a set lifetime.

Figure 20:
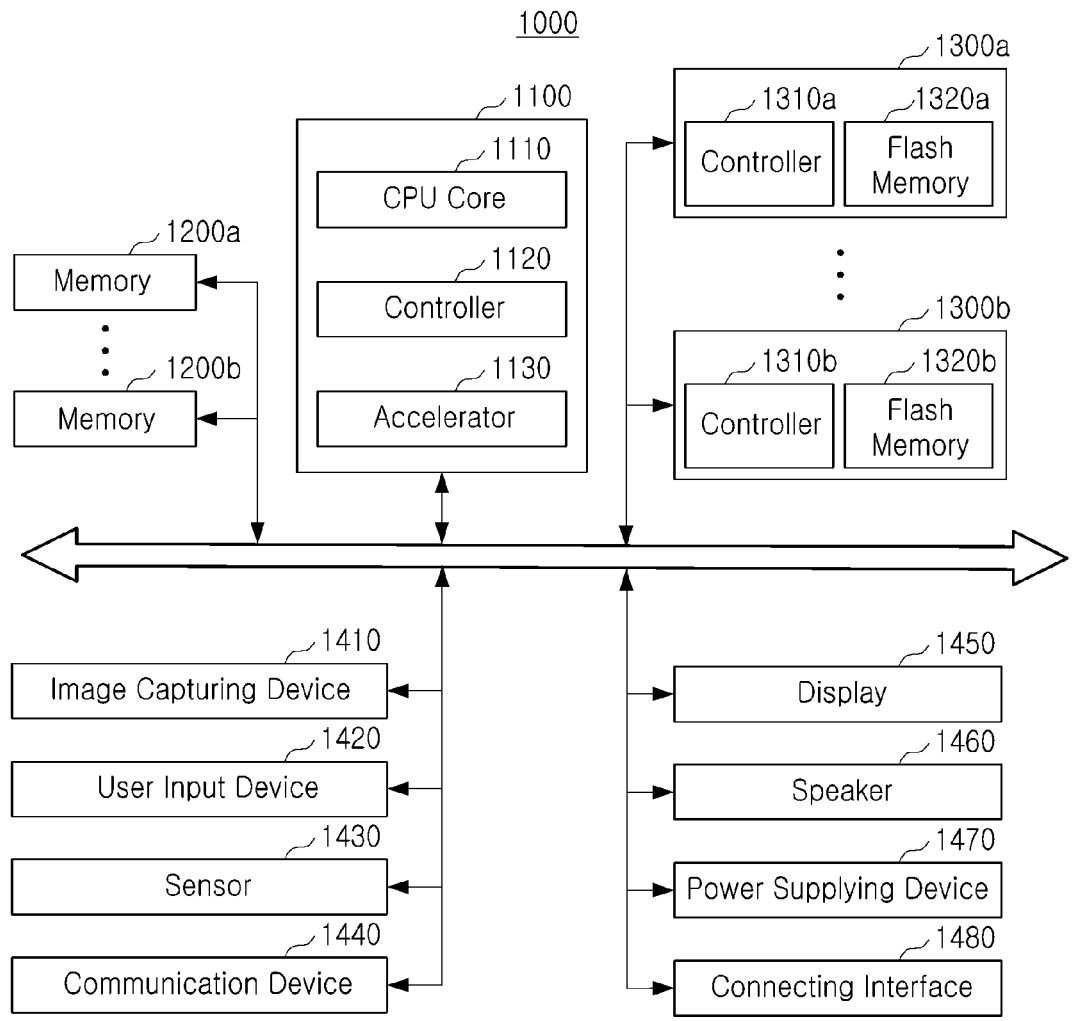

FIG. 20 is a diagram illustrating a system 1000 to which a storage device according to an example embodiment is applied. The system 1000 of FIG. 20 may be a mobile system such as Portable communication terminal (mobile phone), smart phone, tablet PC (tablet personal computer), wearable device, healthcare device or Internet of things (IOT) device. However, the system 1000 of FIG. 20 is not necessarily limited to a mobile system, and may be a personal computer, a laptop computer, a server, a media player, or an automotive device such as a navigation device.

Referring to FIG. 20, the system 1000 may include a main processor 1100, memories 1200a and 1200b, and storage devices 1300a and 1300b, and may additionally include one or more of an image capturing device 1410, a user input device 1420, a sensor 1430, a communication device 1440, a display 1450, a speaker 1460, a power supplying device 1470, and a connecting interface 1480.

The main processor 1100 may control the overall operation of the system 1000, including the operation of other components constituting the system 1000. The main processor 1100 may be implemented as a general-purpose processor, a dedicated processor, or an application processor.

The main processor 1100 may include one or more CPU cores 1110 and may further include a controller 1120 for controlling the memories 1200a and 1200b and/or the storage devices 1300a and 1300b. According to an embodiment, the main processor 1100 may further include an accelerator 1130 that is a dedicated circuit for high-speed data operation such as artificial intelligence (AI) data operation. The accelerator 1130 may include a graphics processing unit (GPU), a neural processing unit (NPU), and/or a data processing unit (DPU), and the like, and may be implemented as a separate chip physically independent from other components of the main processor 1100.

The memories 1200a and 1200b may be used as the main memory device of the system 1000 and may include volatile memories such as SRAM and/or DRAM, and may also include nonvolatile memory such as flash memory, PRAM and/or RRAM. The memories 1200a and 1200b may be implemented in the same package as the main processor 1100.

The storage devices 1300a and 1300b may function as nonvolatile storage devices that store data regardless of whether power is supplied or not, and may have a relatively large storage capacity compared to the memories 1200a and 1200b. The storage devices 1300a and 1300b may include storage controllers 1310a and 1310b and nonvolatile memory (NVM) 1320a and 1320b for storing data under the control of the storage controllers 1310a and 1310b. The nonvolatile memories 1320a and 1320b may include a flash memory having a 2-dimensional (2D) structure or a 3-dimensional (3D) Vertical NAND (V-NAND) structure, and may include other types of nonvolatile memory such as PRAM and/or RRAM.

The storage devices 1300a and 1300b may be included in the system 1000 in a state physically separated from the main processor 1100, or may be implemented in the same package as the main processor 1100. In addition, the storage devices 1300a and 1300b may be a solid state device (SSD) or a memory card, and may be detachably coupled to other components of the system 1000 through an interface such as a connecting interface 1480 to be described later. The storage devices 1300a and 1300b may be devices to which standard protocols such as Universal Flash Storage (UFS), embedded multi-media card (eMMC), or nonvolatile memory express (NVMe) are applied, and but is not necessarily limited thereto.

According to an example embodiment, the storage devices 1300a and 1300b may execute only commands received from a legitimate user through token-based authentication. Accordingly, the security of the storage devices 1300a and 1300b may be improved.

The image capturing device 1410 may capture a still image or a video, and may be a camera, a camcorder, and/or a webcam. The user input device 1420 may receive various types of data input from a user of the system 1000, and may be a touch pad, a keypad, a keyboard, a mouse, and/or a microphone.

The sensor 1430 may detect various types of physical quantities that may be acquired from the outside of the system 1000, and may convert the sensed physical quantities into electrical signals. The sensor 1430 may be a temperature sensor, a pressure sensor, an illuminance sensor, a position sensor, an acceleration sensor, a biosensor and/or a gyroscope sensor.

The communication device 1440 may transmit and receive signals between other devices outside the system 1000 according to various communication protocols. The communication device 1440 may be implemented including an antenna, a transceiver, and/or a modem.

The display 1450 and the speaker 1460 may function as output devices that respectively output visual information and auditory information to the user of the system 1000.

The power supplying device 1470 may appropriately convert power supplied from a battery (not illustrated) built into the system 1000 and/or an external power source and supply the converted power to each component of the system 1000.

The connecting interface 1480 may provide a connection between the system 1000 and an external device connected to the system 1000 to exchange data with the system 1000. The connecting interface 1480 may be implemented in various interface methods such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, universal serial bus (USB), secure digital (SD) card, multi-media card (MMC), eMMC, UFS, embedded universal flash storage (eUFS), or compact flash (CF) card interface.

As set forth above, according to example embodiments, configurations and operations related to a storage device supporting various command operations may be provided.

According to example embodiments, a storage device may allow execution of a specific command only to a user having a legitimate right through token-based authentication.

According to example embodiments, even when command execution is requested together with a validly issued token, in a case in which the lifetime of the token expires or the token is retrieved by an administrator of the host, the storage device may prohibit execution of the command by the corresponding token. Accordingly, the security of the storage device may be improved.

While example embodiments have been illustrated and described above, it will be apparent to those skilled in the art that modifications and variations could be made without departing from the scope of the present inventive concept as defined by the appended claims.

What is claimed is:

1. A storage device comprising:
a memory device storing data; and
a controller controlling the memory device,
wherein the controller obtains and stores a certificate including a public key of an administrator from a host device, provides a nonce to the host device in response to a request from the host device, receives a token request signature including the nonce, a user identifier (ID), an allowed command list and a lifetime from the host device, and when it is verified that the token request signature is generated by a legitimate administrator by decrypting the token request signature with the public key, generates a token for allowing a user corresponding to the user ID to execute a command included in the allowed command list during the lifetime, and a token secret key corresponding to the token, and provides the token and the token secret key to the host device.

2. The storage device of claim 1, wherein the controller provides a nonce to the host device in response to a request from the host device, receives a certificate replacement signature including the nonce and a new certificate from the host device, and replaces the stored certificate with the new certificate when it is verified that the certificate replacement signature has been received from a legitimate administrator by decrypting the signature with the public key.

3. The storage device of claim 1, wherein the controller stores a token list including a token secret key and a lifetime corresponding to the token, a user list including a user ID corresponding to the token, and an allowed command list including commands that may be executed using the token.

4. The storage device of claim 3, wherein the controller provides a nonce to the host device in response to a request from the host device, receives a signature for revoking access authority including a nonce, a user ID, and a revoking command list from the host device, and removes a command included in the revoking command list from among commands that may be executed using a token corresponding to the user ID, from the allowed command list, when it is verified that the signature for revoking the access authority is generated by a legitimate administrator by decrypting the signature for revoking access authority with the public key.

5. The storage device of claim 1, wherein the signature for the token request further includes an allowable logical address range, and
the controller generates a token for allowing execution of a command included in the allowed command list within the allowable logical address range.

6. The storage device of claim 5, wherein the allowable logical address range includes a Logical Block Address (LBA) range or includes a namespace ID.

7. A storage device comprising:
a memory device storing data; and
a controller controlling the memory device,
wherein the controller receives a command message including a token and a command and an external authentication code from a user of a host device, generates an internal authentication code by encrypting the command message using a token secret key corresponding to the token, determines whether the token is a valid token by comparing the external authentication code with the internal authentication code, and executes the command according to a result of determining whether the token is a token granted to the user when the token is a valid token and whether the token is a token for allowing the execution of the command.

8. The storage device of claim 7, wherein the controller determines whether the token has expired based on a lifetime of the token, and updates the token and the token secret key when the token has expired.

9. The storage device of claim 8, wherein the lifetime indicates the number of times the token may be used, and
the controller updates the lifetime when the command is executed.

10. The storage device of claim 7, wherein the controller generates an updated token by adding a salt value to the token and performing a hash operation on the token to which the salt value has been added.

11. The storage device of claim 8, wherein the controller receives an expired token and an external authentication code from the user, generates an internal authentication code by encrypting the expired token using a token secret key corresponding to the expired token, determines whether the expired token is a token received from a legitimate user by comparing the external authentication code with the internal authentication code, encrypts an updated token and an updated token secret key according to a determination result using the token secret key of the expired token, and provides the encrypted updated token and the encrypted updated token secret key to the user.

12. The storage device of claim 11, wherein the controller removes the token secret key of the expired token after providing the encrypted updated token and the encrypted updated token secret key to the user.

13. The storage device of claim 7, wherein the command message further includes a target address of the command,
wherein the controller executes the command on the target address by further determining whether the target address is within an allowable address range for the received command.

14. The storage device of claim 7, wherein the controller stores a token list including a token secret key and a lifetime corresponding to the token, a user list including a user ID corresponding to the token, and an allowed command list including commands that may be executed using the token.

15. A method of operating an electronic system including a host device and a storage device, the method comprising:
generating, by the host device, a token request signature for allowing a specific user to execute a specific command, using a private key of an administrator, and providing the token request signature to the storage device;
verifying, with the storage device, the token request signature using a public key paired with the private key;

generating, with the storage device, a token and a token secret key, storing the token and the token secret key in the storage device, and providing the token and the token secret key to the host device;

providing, by the host device, a command message including a command requested by a user and the token, and an external authentication code obtained by encrypting the command message using the token secret key provided to the host device, to the storage device;

generating, with the storage device, an internal authentication code obtained by encrypting the command message using the token secret key stored in the storage device, and determining whether the token provided by the host device is a valid token by comparing the internal authentication code with an external authentication code; and when the token provided by the host device is a valid token, executing, with the storage device, the command according to a result of determining whether the token provided by the host device was granted to the user and whether the token provided by the host device is authorized for execution of the command.

16. The method of claim 15, further comprising receiving, with the storage device, a certificate including the public key from the host device and storing the certificate in the storage device.

17. The method of claim 16, further comprising:

generating a certificate replacement signature by the host device signing a new certificate using the private key, and providing the signature to the storage device; and verifying, with the storage device, the certificate replacement signature using the public key, and replacing the certificate stored in the storage device with the new certificate.

18. The method of claim 15, further comprising:

updating, with the storage device, a lifetime of the token when the command is executed; and determining, with the storage device, whether the token has expired based on a lifetime of the token, and updating the token and the token secret key stored in the storage device when the token has expired.

19. The method of claim 18, further comprising:

generating, by the host device, an external authentication code by encrypting an expired token using an expired token secret key, and providing the expired token and the external authentication code to the storage device;

generating an internal authentication code by encrypting the expired token with the storage device using an expired token secret key stored in the storage device, and verifying whether the expired token is a token received from a legitimate user by comparing the external authentication code and the internal authentication code; and encrypting, with the storage device, an updated token and an updated token secret key using the expired token secret key according to a result of the verification, and providing the encrypted updated token and the encrypted updated token secret key to the host device.

20. The method of claim 15, further comprising storing, with the storage device, a token list including the token, the token secret key, a lifetime of the token, a user list including users of the token, and commands that may be executed by the token.

* * * * *